United States Patent
Hubbard et al.

(10) Patent No.: US 10,933,982 B2
(45) Date of Patent: *Mar. 2, 2021

(54) METHODS AND APPARATUS FOR CONTROLLING LANDING GEAR RETRACT BRAKING

(71) Applicant: The Boeing Company, Chicago, IL (US)

(72) Inventors: Taylor R. Hubbard, Everett, WA (US); Isaac Neale, Everett, WA (US); Leo W. Plude, Woodinville, WA (US); Daniel B. Douglass, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/905,392

(22) Filed: Feb. 26, 2018

(65) Prior Publication Data

US 2019/0263506 A1 Aug. 29, 2019

(51) Int. Cl.
*B64C 25/26* (2006.01)
*B64C 25/12* (2006.01)
(Continued)

(52) U.S. Cl.
CPC ............ *B64C 25/26* (2013.01); *B60T 8/1703* (2013.01); *B64C 25/12* (2013.01); *B64C 25/34* (2013.01);
(Continued)

(58) Field of Classification Search
CPC ......... B64C 25/26; B64C 25/12; B64C 25/34; B64C 25/42; B64C 25/46; B64C 25/426; B60T 8/1703; B60T 8/325
(Continued)

(56) References Cited

U.S. PATENT DOCUMENTS 2,663,521 A 12/1953 Yarber
2,921,759 A * 1/1960 Elkin ..................... B64C 25/12
244/102 R
(Continued)

FOREIGN PATENT DOCUMENTS

AT 412565 T * 11/2008 .......... B60T 8/17616
AU 2003251891 A1 * 3/2004 ............ B60T 8/1703
(Continued)

OTHER PUBLICATIONS

European Patent Office, "Supplementary European Search Report," issued in connection with European Patent Application No. 18212931.2, dated Jul. 22, 2019, 3 pages.
(Continued)

*Primary Examiner* — Behrang Badii
*Assistant Examiner* — Jalal C Coduroglu
(74) *Attorney, Agent, or Firm* — Hanley, Flight & Zimmerman, LLC

(57) ABSTRACT

Methods and apparatus for controlling landing gear retract braking are described. A controller determines wheel speed data corresponding to a speed of a wheel of a landing gear. The controller determines wheel deceleration data corresponding to a rate of change of the wheel speed data. The controller generates a first control signal in response to the wheel deceleration data being greater than a wheel deceleration threshold. The first control signal initiates a wheel deceleration regulation process, the wheel deceleration regulation process to cycle an antiskid valve between a first valve position to release brake pressure from the wheel and a second valve position to cease releasing the brake pressure from the wheel. The controller generates a second control signal in response to the wheel speed data being less than a wheel speed threshold. The second control signal terminates the wheel deceleration regulation process.

23 Claims, 14 Drawing Sheets

(51) Int. Cl.
*B64C 25/34* (2006.01)
*B64C 25/42* (2006.01)
*B60T 8/17* (2006.01)
*B64C 25/46* (2006.01)
*B60T 8/32* (2006.01)

(52) U.S. Cl.
CPC .............. *B64C 25/42* (2013.01); *B64C 25/46* (2013.01); *B60T 8/325* (2013.01); *B64C 25/426* (2013.01)

(58) Field of Classification Search
USPC .......................................................... 701/3
See application file for complete search history.

(56) References Cited

U.S. PATENT DOCUMENTS

| | | | | |
|---|---|---|---|---|
| 2,930,552 A * | 3/1960 | Hartel | ................ | B64C 25/50 244/103 R |
| 2,982,500 A * | 5/1961 | Lucien | ................ | B64C 25/14 244/102 R |
| 3,042,345 A * | 7/1962 | Holland, Jr. | ............ | B64C 25/00 244/104 R |
| 3,485,462 A | 12/1969 | Churchill | | |
| 3,614,173 A * | 10/1971 | Branson | ................ | B60T 8/1703 303/159 |
| 4,078,845 A * | 3/1978 | Amberg | ................ | B60T 8/1703 303/159 |
| 4,326,755 A * | 4/1982 | Fretz, III | ............ | B64C 25/426 303/176 |
| 4,576,417 A * | 3/1986 | Dobner | ................ | B60T 8/38 303/114.2 |
| 4,655,312 A * | 4/1987 | Frantom | ................ | B60R 22/44 180/268 |
| 4,875,391 A * | 10/1989 | Leising | ............... | F16H 61/0206 477/155 |
| 5,040,648 A * | 8/1991 | Mitchell | ............... | B60W 10/02 192/13 R |
| 5,050,940 A * | 9/1991 | Bedford | ................ | B64C 25/42 303/166 |
| 5,117,934 A * | 6/1992 | Tsuyama | ................ | B60T 8/172 180/197 |
| 5,201,478 A | 4/1993 | Wooley | | |
| 5,605,387 A * | 2/1997 | Cook | ....................... | B60T 8/00 188/181 T |
| 5,623,411 A * | 4/1997 | Morvan | ............... | G05D 1/0077 324/73.1 |
| 5,700,072 A * | 12/1997 | Cook | ....................... | B60T 8/00 188/181 T |
| 5,777,218 A * | 7/1998 | Salamat | ................ | B60T 7/12 340/453 |
| 5,962,777 A * | 10/1999 | Salamat | ................ | B60T 7/12 340/453 |
| 6,129,025 A * | 10/2000 | Minakami | ................ | B60L 50/51 104/88.01 |
| 6,132,016 A * | 10/2000 | Salamat | ................ | B60T 8/1703 303/112 |
| 6,134,956 A * | 10/2000 | Salamat | ................ | B60T 7/12 340/453 |
| 6,345,872 B2 * | 2/2002 | Salamat | ................ | B60T 8/1703 303/112 |
| 6,474,598 B2 * | 11/2002 | Carter, Jr. | ............... | B64C 25/60 188/267.1 |
| 6,513,885 B1 * | 2/2003 | Salamat | ................ | B60T 8/1703 303/122.09 |
| 6,527,350 B2 * | 3/2003 | Salamat | ................ | B60T 8/1703 188/181 T |
| 6,575,405 B2 * | 6/2003 | Bryant | ................ | B64C 25/001 244/102 SL |
| 6,655,755 B2 * | 12/2003 | Salamat | ................ | B60T 8/1703 303/155 |
| 6,704,634 B1 * | 3/2004 | Gowan | ................ | B64C 25/10 244/100 R |
| 6,722,745 B2 * | 4/2004 | Salamat | .................... | B60T 8/52 303/126 |
| 6,820,946 B2 * | 11/2004 | Salamat | ................ | B60T 8/1703 303/122.09 |
| 6,824,092 B1 * | 11/2004 | Franklin, III | ........... | B64C 30/00 244/1 N |
| 6,854,689 B1 | 2/2005 | Lindahl et al. | | |
| 6,882,920 B2 * | 4/2005 | Rudd, III | ............... | B60T 8/1703 303/155 |
| 6,890,041 B1 * | 5/2005 | Ribbens | .............. | B60T 8/17616 303/112 |
| 6,916,075 B2 * | 7/2005 | Salamat | ................ | B60T 8/1703 303/112 |
| 6,921,045 B2 * | 7/2005 | Chang | ................... | B64C 13/505 244/15 |
| 6,942,182 B2 * | 9/2005 | Quayle | .................... | B64C 25/14 244/102 R |
| 6,951,372 B2 * | 10/2005 | Salamat | ................ | B60T 8/1703 303/112 |
| 7,039,517 B2 * | 5/2006 | Rudd, III | ............... | B60T 8/1703 303/126 |
| 7,093,795 B2 | 8/2006 | Lindahl et al. | | |
| 7,110,873 B2 * | 9/2006 | Rudd, III | ............... | B60T 8/1703 303/155 |
| 7,128,377 B2 * | 10/2006 | Salamat | ................ | B60T 8/1703 303/139 |
| 7,165,820 B2 * | 1/2007 | Rudd, III | ............... | B60T 8/1703 303/155 |
| 7,274,310 B1 * | 9/2007 | Nance | .................... | G08B 21/00 244/100 R |
| 7,387,349 B2 * | 6/2008 | Salamat | ................ | B60T 8/1703 303/154 |
| 7,475,849 B2 | 1/2009 | Lindahl et al. | | |
| 7,500,724 B2 * | 3/2009 | Salamat | ................ | B60T 8/1703 303/112 |
| 7,618,100 B2 * | 11/2009 | Griffith | ................ | B60T 8/1703 303/126 |
| 7,744,167 B2 * | 6/2010 | Salamat | ................ | B60T 8/17616 303/166 |
| 7,837,279 B2 * | 11/2010 | Salamat | ................ | B60T 8/1703 303/112 |
| 8,042,765 B1 * | 10/2011 | Nance | ................ | B64D 45/0005 244/100 R |
| 8,175,762 B2 | 5/2012 | Trotter et al. | | |
| 8,180,548 B2 * | 5/2012 | Cahill | ................... | B60T 8/1703 701/79 |
| 8,335,607 B2 * | 12/2012 | Gatten | ..................... | B60D 1/01 180/14.2 |
| 8,684,306 B2 * | 4/2014 | Martin | .................... | B64C 25/50 244/102 SL |
| 8,695,921 B2 | 4/2014 | Bourret et al. | | |
| 8,727,454 B2 * | 5/2014 | DeVlieg | .................. | B60T 8/00 303/126 |
| 9,266,604 B2 * | 2/2016 | Salamat | ................ | B64C 13/343 |
| 9,321,525 B2 * | 4/2016 | Luce | ........................ | B64C 25/28 |
| 9,327,600 B1 * | 5/2016 | Nehmeh | ................... | B60L 1/00 |
| 10,005,566 B2 * | 6/2018 | Cahill | ....................... | B64F 5/60 |
| 2003/0033927 A1 * | 2/2003 | Bryant | .................... | B64C 25/62 91/471 |
| 2003/0111895 A1 | 6/2003 | Salamat et al. | | |
| 2004/0040797 A1 * | 3/2004 | Plude | ..................... | F16D 65/186 188/156 |
| 2004/0189084 A1 * | 9/2004 | Salamat | ............... | B60T 8/17616 303/112 |
| 2005/0225171 A1 * | 10/2005 | Salamat | ............... | B60T 8/17616 303/155 |
| 2006/0181034 A1 * | 8/2006 | Wilde | ................ | B60T 8/1703 |
| 2006/0293805 A1 * | 12/2006 | Garcia | ................... | B60T 8/885 701/16 |
| 2007/0132311 A1 * | 6/2007 | Giazotto | ................ | B60T 8/1703 303/126 |
| 2008/0150353 A1 * | 6/2008 | Griffith | ..................... | B60T 7/12 303/126 |
| 2008/0154470 A1 * | 6/2008 | Goranson | ................ | B60T 8/1703 701/70 |

(56) References Cited

U.S. PATENT DOCUMENTS

| | | | |
|---|---|---|---|
| 2009/0057073 A1* | 3/2009 | Ishii | B60T 5/00 |
| | | | 188/71.6 |
| 2009/0115248 A1* | 5/2009 | Salamat | B60T 8/17616 |
| | | | 303/155 |
| 2010/0013296 A1* | 1/2010 | Raby | B64C 25/46 |
| | | | 303/126 |
| 2010/0274457 A1* | 10/2010 | Cahill | B60T 13/741 |
| | | | 701/70 |
| 2013/0015284 A1* | 1/2013 | Tracey | B65H 75/403 |
| | | | 242/390.2 |
| 2014/0021283 A1* | 1/2014 | Tracey | B65H 75/4484 |
| | | | 242/390.9 |
| 2014/0100074 A1* | 4/2014 | Glugla | B60W 10/184 |
| | | | 477/3 |
| 2014/0100758 A1* | 4/2014 | Glugla | F02D 41/123 |
| | | | 701/103 |
| 2014/0131523 A1* | 5/2014 | Carner | B64C 13/06 |
| | | | 244/235 |
| 2014/0174066 A1* | 6/2014 | Schulte | F16H 61/46 |
| | | | 60/327 |
| 2015/0102163 A1* | 4/2015 | Luce | B64C 25/22 |
| | | | 244/102 SS |
| 2016/0104382 A1* | 4/2016 | Besada Portas | G08G 5/0095 |
| | | | 701/540 |
| 2016/0168822 A1* | 6/2016 | White | F15B 1/04 |
| | | | 60/413 |
| 2016/0245190 A1* | 8/2016 | Makled | B60W 40/02 |
| 2017/0066529 A1 | 3/2017 | Wilson | |
| 2017/0174324 A1* | 6/2017 | Carner | B64C 13/12 |
| 2017/0183086 A1 | 6/2017 | Le-Bouedec et al. | |
| 2017/0355473 A1 | 12/2017 | Cahill | |
| 2018/0362151 A1 | 12/2018 | Marles | |
| 2019/0168884 A1 | 6/2019 | Stafford | |
| 2019/0263506 A1* | 8/2019 | Hubbard | B60T 8/1703 |
| 2019/0263511 A1* | 8/2019 | Plude | B64C 25/42 |

FOREIGN PATENT DOCUMENTS

| | | | | | |
|---|---|---|---|---|---|
| BR | 0313644 A | * | 6/2005 | | B60T 8/52 |
| BR | PI0313644 B1 | * | 2/2017 | | B60T 8/17616 |
| CA | 2496201 A1 | * | 3/2004 | | B60T 8/1703 |
| CA | 2496201 C | * | 5/2010 | | B60T 8/52 |
| CN | 1675095 A | * | 9/2005 | | B60T 8/17616 |
| CN | 110194263 A | * | 9/2019 | | B60T 8/1703 |
| DE | 60324443-D1 | * | 12/2008 | | B60T 8/1703 |
| EP | 1545949 A1 | * | 6/2005 | | B60T 8/17616 |
| EP | 1545949 B1 | * | 10/2008 | | B60T 8/1703 |
| EP | 3257712 | | 12/2017 | | |
| EP | 3530565 A1 | * | 8/2019 | | B64C 25/34 |
| ES | 2314278 T3 | * | 3/2009 | | B60T 8/17616 |
| JP | 2019142480 A | * | 8/2019 | | B64C 25/42 |
| WO | WO-0069721 A1 | * | 11/2000 | | B60T 8/00 |
| WO | WO-2004018274 A1 | * | 3/2004 | | B60T 8/17616 |

OTHER PUBLICATIONS

European Patent Office, "Communication pursuant to Article 94(3) EPC," issued in connection with European Patent Application No. 18212931.2, dated Aug. 6, 2019, 6 pages.

European Patent Office, "Communication pursuant to Article 94(3) EPC," issued in connection with European Patent Application No. 18212931.2, dated Feb. 27, 2020, 5 pages.

European Patent Office, "Extended European Search Report," issued in connection with European Patent Application No. 18211961.0, dated Jun. 13, 2019, 7 pages.

United States Patent and Trademark Office, "Non-Final Office Action," issued in connection with U.S. Appl. No. 15/904,003, dated Mar. 18, 2020, 10 pages.

United States Patent and Trademark Office, "Final Office Action," issued in connection with U.S. Appl. No. 15/904,003, dated Jun. 29, 2020, 12 pages.

* cited by examiner

METHODS AND APPARATUS FOR CONTROLLING LANDING GEAR RETRACT BRAKING

FIELD OF THE DISCLOSURE

This disclosure relates generally to landing gear for aircraft and, more particularly, to methods and apparatus for controlling landing gear retract braking.

BACKGROUND

Aircraft (e.g., commercial aircraft) commonly include landing gear (e.g., left main landing gear, right main landing gear, etc.) that may be hydraulically actuated to move between a deployed position and a retracted position. For example, the landing gear of an aircraft may by hydraulically actuated to move from the deployed position to the retracted position subsequent to and/or in connection with a takeoff procedure of the aircraft, and from the retracted position back to the deployed position prior to and/or in connection with a landing procedure of the aircraft.

One or more wheel(s) of the landing gear may be stored and/or housed within a well of the aircraft when the landing gear is in the retracted position. The wheels of the landing gear spin during and subsequent to takeoff, and typically remain spinning at the time the landing gear begins to move from the deployed position to the retracted position. A collision between the wheels of the landing gear and the well of the aircraft may occur if the wheels remain spinning at the time the wheels begin to enter the well. Undesirable noise and/or vibration may occur within the cabin of the aircraft if the wheels remain spinning once inside the well.

Hydraulic retract braking systems may be implemented to decelerate and/or despin the wheels of the landing gear prior to and/or while the landing gear moves from the deployed position to the retracted position. Actuation of such hydraulic retract braking systems typically occurs in response to a manual actuation (e.g., via a pilot of the aircraft) of a landing gear lever located in a cockpit of the aircraft. During takeoff, the manual actuation of the landing gear lever by the pilot of the aircraft occurs after the pilot has first ascertained (e.g., physically determined) that the aircraft is airborne (e.g., that no landing gear of the aircraft is in contact with a ground surface and a positive rate of climb has been established). As a result of typical human and/or pilot response times, the time at which the manual actuation of the landing gear lever occurs may be delayed relative to the time at which the aircraft first becomes airborne. Such delays limit the amount of time available to decelerate and/or despin the wheels of the landing gear before the wheels enter the well of the aircraft.

Some aircraft implement landing gear that must be shrunk (e.g., reduced in length) prior to being moved from the deployed position to the retracted position. For example, the length of the landing gear may need to be reduced (e.g., shrunk) such that the landing gear is able to fit within the spatial confines of a well of the aircraft that stows the landing gear in the retracted position. In some such aircraft, rapid deceleration and/or despin of the wheels may result in an applied moment that decreases the length of the landing gear, followed by a rebound that increases the length of the landing gear. The applied moment and rebound may fatigue certain structural components of the landing gear, and may also cause such structural components and/or the wheels of the landing gear to be out of place when entering the well of the aircraft, thereby resulting in a collision.

SUMMARY

Methods and apparatus for controlling landing gear retract braking are disclosed. In some examples, an apparatus is disclosed. In some examples, an apparatus is disclosed. In some disclosed examples, the apparatus comprises a controller. In some disclosed examples, the controller is to determine wheel speed data corresponding to a speed of a wheel of a landing gear. In some disclosed examples, the controller is to determine wheel deceleration data corresponding to a rate of change of the wheel speed data. In some disclosed examples, the controller is to generate a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the controller is to generate a second control signal in response to the wheel speed data being less than a wheel speed threshold. In some disclosed examples, the second control signal is to terminate the wheel deceleration regulation process.

In some examples, a method is disclosed. In some disclosed examples, the method comprises determining, by executing one or more instructions via a controller, wheel speed data corresponding to a speed of a wheel of a landing gear. In some disclosed examples, the method comprises determining, by executing one or more instructions via the controller, wheel deceleration data corresponding to a rate of change of the wheel speed data. In some disclosed examples, the method comprises generating, by executing one or more instructions via the controller, a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the method comprises generating, by executing one or more instructions via the controller, a second control signal in response to the wheel speed data being less than a wheel speed threshold. In some disclosed examples, the second control signal is to terminate the wheel deceleration regulation process.

In some examples, a non-transitory machine-readable storage medium comprising instructions is disclosed. In some disclosed examples, the instructions, when executed, cause a controller to determine wheel speed data corresponding to a speed of a wheel of a landing gear. In some disclosed examples, the instructions, when executed, cause the controller to determine wheel deceleration data corresponding to a rate of change of the wheel speed data. In some disclosed examples, the instructions, when executed, cause the controller to generate a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the instructions, when executed, cause the controller to generate a second control signal in response to the wheel speed data being less than a wheel speed threshold. In some disclosed examples, the second control signal is to terminate the wheel deceleration regulation process.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
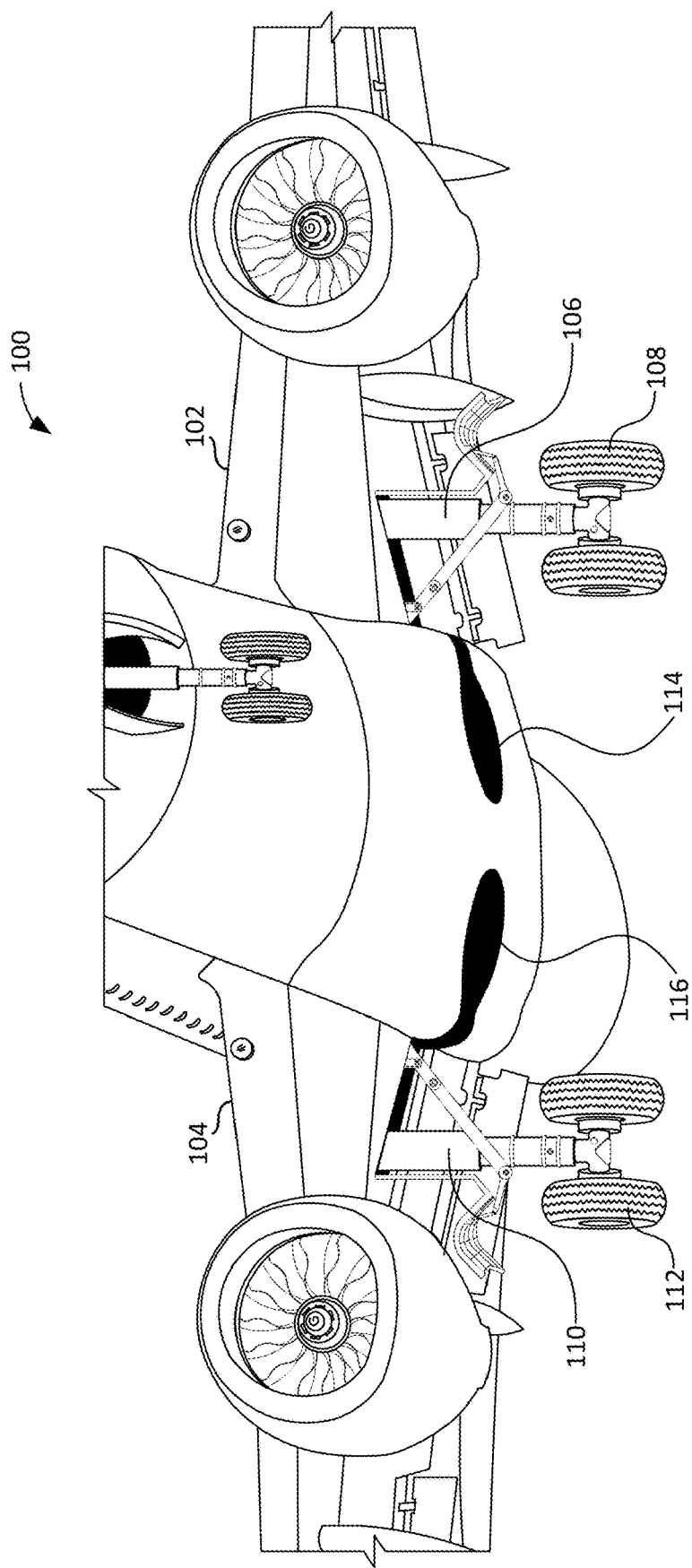
FIG. 1 illustrates an example aircraft in which an example retract braking control system may be implemented in accordance with the teachings of this disclosure.

FIG. 1 illustrates an example aircraft 100 in which an example retract braking system may be implemented in accordance with the teachings of this disclosure. The aircraft 100 includes an example left wing 102 and an example right wing 104. The aircraft 100 also includes an example left main landing gear (LMLG) 106 coupled to the left wing 102 and having a first example set of wheels 108, and an example right main landing gear (RMLG) 110 coupled to the right wing 104 and having a second example set of wheels 112. In the illustrated example of FIG. 1, the first set of wheels 108 and the second set of wheels 112 respectively include two wheels. In other examples, the first set of wheels 108 and the second set of wheels 112 may respectively include a number of wheels other than two (e.g., one wheel, four wheels, etc.).

In the illustrated example of FIG. 1, the LMLG 106 and the RMLG 110 are in a deployed (e.g., downlocked) position. The LMLG 106 is movable from the deployed position shown in FIG. 1 to a retracted position in which the LMLG 106 and/or the first set of wheels 108 is/are positioned in a first example well 114 of the aircraft 100 of FIG. 1. The RMLG 110 is also movable from the deployed position shown in FIG. 1 to a retracted position in which the RMLG 110 and/or the second set of wheels 112 is/are positioned in a second example well 116 of the aircraft 100 of FIG. 1. Downlock members (e.g., downlock struts, rods, shafts, and/or links) that are respectively coupled to corresponding ones of the LMLG 106 and the RMLG 110 of FIG. 1 may be positioned and/or engaged to secure and/or lock the LMLG 106 and the RMLG 110 in the deployed position, and may be repositioned and/or disengaged to enable the LMLG 106 and the RMLG 110 to be moved from the deployed position to the retracted position. Movement of the LMLG 106 and the RMLG 110 between the deployed and retracted positions occurs via a landing gear hydraulic actuation system located within the aircraft 100 of FIG. 1. The landing gear hydraulic actuation system is operatively coupled to a controller located within the aircraft 100 of FIG. 1. The controller manages and/or controls the operation of the landing gear hydraulic actuation system.

The first set of wheels 108 of the LMLG 106 and the second set of wheels 112 of the RMLG 110 spin and/or rotate following takeoff of the aircraft 100. In some examples, the rate of spin and/or rotation of the first and second sets of wheels 108, 112 may exceed eighteen hundred revolutions per minute (1800 rpm). A braking process may be implemented during a landing gear retraction process to reduce the rate of rotation and/or spin of the first and second sets of wheels 108, 112 to a value of zero revolutions per minute (0 rpm). In some examples, it is desirable that the braking process be completed prior to the LMLG 106 and the RMLG 110 reaching the retracted position, and/or prior to the first and second sets of wheels 108, 116 entering respective ones of the first and second wells 114, 116. Braking (e.g., deceleration and/or despin) of the first set of wheels 108 and the second set of wheels 112 during the landing gear retraction process occurs via a hydraulic retract braking system located within the aircraft 100 of FIG. 1. The hydraulic retract braking system is operatively coupled to a controller located within the aircraft 100 of FIG. 1. The controller manages and/or controls the operation of the hydraulic retract braking system.

In some examples, a landing gear lever located within the aircraft 100 of FIG. 1 (e.g., in a cockpit of the aircraft 100) is operatively coupled to the controller. Movement of the landing gear lever (e.g., via a pilot) between a down position and an up position generates corresponding positional inputs to be received by the controller to facilitate movement of the LMLG 106 and the RMLG 110 between the deployed and retracted positions described above. The landing gear lever may be moved from the down position to the up position subsequent to and/or in connection with a takeoff procedure of the aircraft 100 of FIG. 1. The landing gear lever may be moved from the up position to the down position prior to and/or in connection with a landing procedure of the aircraft 100 of FIG. 1. In some examples, operation of the retract braking control systems disclosed herein may be based in part on the position of the landing gear lever.

In other examples (e.g., in examples where the aircraft 100 of FIG. 1 is an unmanned and/or autonomous aircraft), a landing gear position manager (e.g., a programmable processor) located within the aircraft 100 of FIG. 1 is operatively coupled to the controller. The landing gear position manager may be remotely programmed, commanded, set, and/or controlled to obtain, take on, and/or achieve a first state corresponding to a down position or a second state corresponding to an up position to generate corresponding positional inputs to be received by the controller to facilitate movement of the LMLG 106 and the RMLG 110 between the deployed and retracted positions described above. The landing gear position manager may be remotely programmed, commanded, and/or set to the first state corresponding to the up position subsequent to and/or in connection with a takeoff procedure of the aircraft 100 of FIG. 1. The landing gear position manager may be remotely programmed, commanded, and/or set to the second state corresponding to the down position prior to and/or in connection with a landing procedure of the aircraft 100 of FIG. 1. In some examples, operation of the retract braking control systems disclosed herein may be based in part on the state and/or the corresponding position of the landing gear position manager.

Respective ones of the LMLG 106 and the RMLG 110 have a first length (e.g., an unshrunk length) when positioned in the deployed (e.g., downlocked) position shown in FIG. 1. For example, the first length of the LMLG 106 may be measured from the underside of the left wing 102 of the aircraft 100 to the bottom of the first set of wheels 108 when the LMLG 106 is positioned in the deployed position shown in FIG. 1, and the first length of the RMLG 110 may be measured from the underside of the right wing 104 of the aircraft 100 to the bottom of the second set of wheels 112 when the RMLG 110 is positioned in the deployed position shown in FIG. 1. In some examples, the first length (e.g., the unshrunk length) of the LMLG 106 and/or the RMLG 110 may exceed spatial limitations defined by the shape and/or volume of corresponding ones of the first well 114 and/or the second well 116 of the aircraft 100 of FIG. 1. In such examples, it becomes necessary to shrink (e.g., to reduce the length of) the LMLG 106 and/or the RMLG 110 from the first length to a second length (e.g., a shrunk length) that is less than the first length, and which enables the LMLG 106 and/or the RMLG 110 to fit within the spatial limitations defined by the shape and/or volume of the corresponding ones of the first well 114 and/or the second well 116 of the aircraft 100 of FIG. 1.

Shrinking and/or unshrinking of the LMLG 106 and/or the RMLG 110 of FIG. 1 may occur via the above-described landing gear hydraulic actuation system of the aircraft 100 of FIG. 1. The LMLG 106 and/or the RMLG 110 of FIG. 1 may be shrunk (e.g. reduced in length) from the first length to the second length prior to and/or in connection with moving the LMLG 106 and/or the RMLG 110 from the deployed position to the retracted position, and may be unshrunk (e.g., increased in length) from the second length to the first length subsequent to and/or in connection with moving the LMLG 106 and/or the RMLG 110 from the retracted position to the deployed position. In some examples, the difference between the first length (e.g., the unshrunk length) and the second length (e.g., the shrunk length) of respective ones of the LMLG 106 and the RMLG 110 of FIG. 1 may be approximately nine inches. In other examples, the difference between the first length and the second length may be greater than or less than nine inches (e.g., six inches, twelve inches, etc.).

Figure 2:
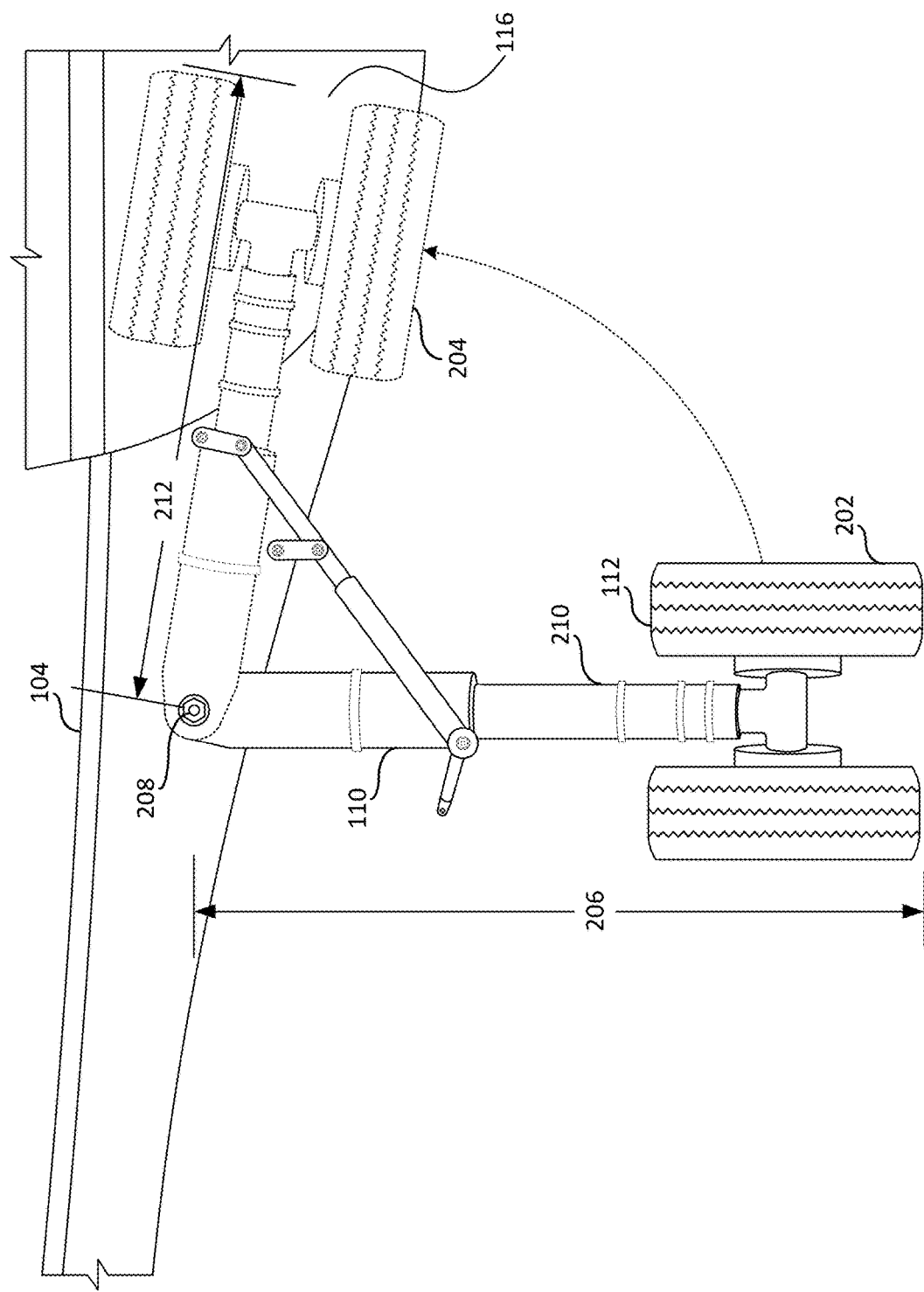
FIG. 2 illustrates the example RMLG of FIG. 1 positioned in an example deployed position and alternatively positioned in an example retracted position.

FIG. 2 illustrates the example RMLG 110 of FIG. 1 positioned in an example deployed position 202 and alternatively positioned in an example retracted position 204. The RMLG 110 of FIGS. 1 and 2 may be positioned in the deployed position 202 of FIG. 2 when the second set of wheels 112 of the RMLG 110 of FIGS. 1 and 2 is not in contact with a ground surface (e.g., when the aircraft 100 of FIG. 1 is airborne). The RMLG 110 of FIGS. 1 and 2 has an example first length 206 measured from an example axis of rotation 208 of the RMLG 110 to the bottom of the second set of wheels 112 of FIGS. 1 and 2 when the RMLG 110 is in the deployed position 202 shown in FIG. 2. In examples where the RMLG 110 is a shrinkable landing gear, the first length 206 of FIG. 2 may be associated with an example landing gear oleo strut 210 of the RMLG 110 of FIGS. 1 and 2 being uncompressed and/or extended in response to the weight of the aircraft 100 being removed from the RMLG 110 subsequent to and/or in connection with takeoff of the aircraft 100.

The RMLG 110 of FIGS. 1 and 2 may be positioned in the retracted position 204 of FIG. 2 (shown in phantom) when the RMLG 110 of FIGS. 1 and 2 is retracted into the second well 116 of FIGS. 1 and 2. The RMLG 110 of FIGS. 1 and 2 has an example second length 212 measured from the axis of rotation 208 of the RMLG 110 to the bottom of the second set of wheels 112 of FIGS. 1 and 2 when the RMLG 110 is in the retracted position 204 shown in FIG. 2. In examples where the RMLG 110 is a shrinkable landing gear, the second length 212 of FIG. 2 is less than the first length 206 of FIG. 2. In some such examples, the second length 212 of FIG. 2 may be approximately nine inches less than the first length 206 of FIG. 2. In other such examples, the difference between the first length 206 and the second length 212 of FIG. 2 may be greater than or less than nine inches (e.g., six inches, twelve inches, etc.). The second length 212 of FIG. 2 may be associated with the landing gear oleo strut 210 of the RMLG 110 of FIGS. 1 and 2 being shrunk and retracted (e.g., from the unshrunk deployed position 202 of FIG. 2).

Figure 3:
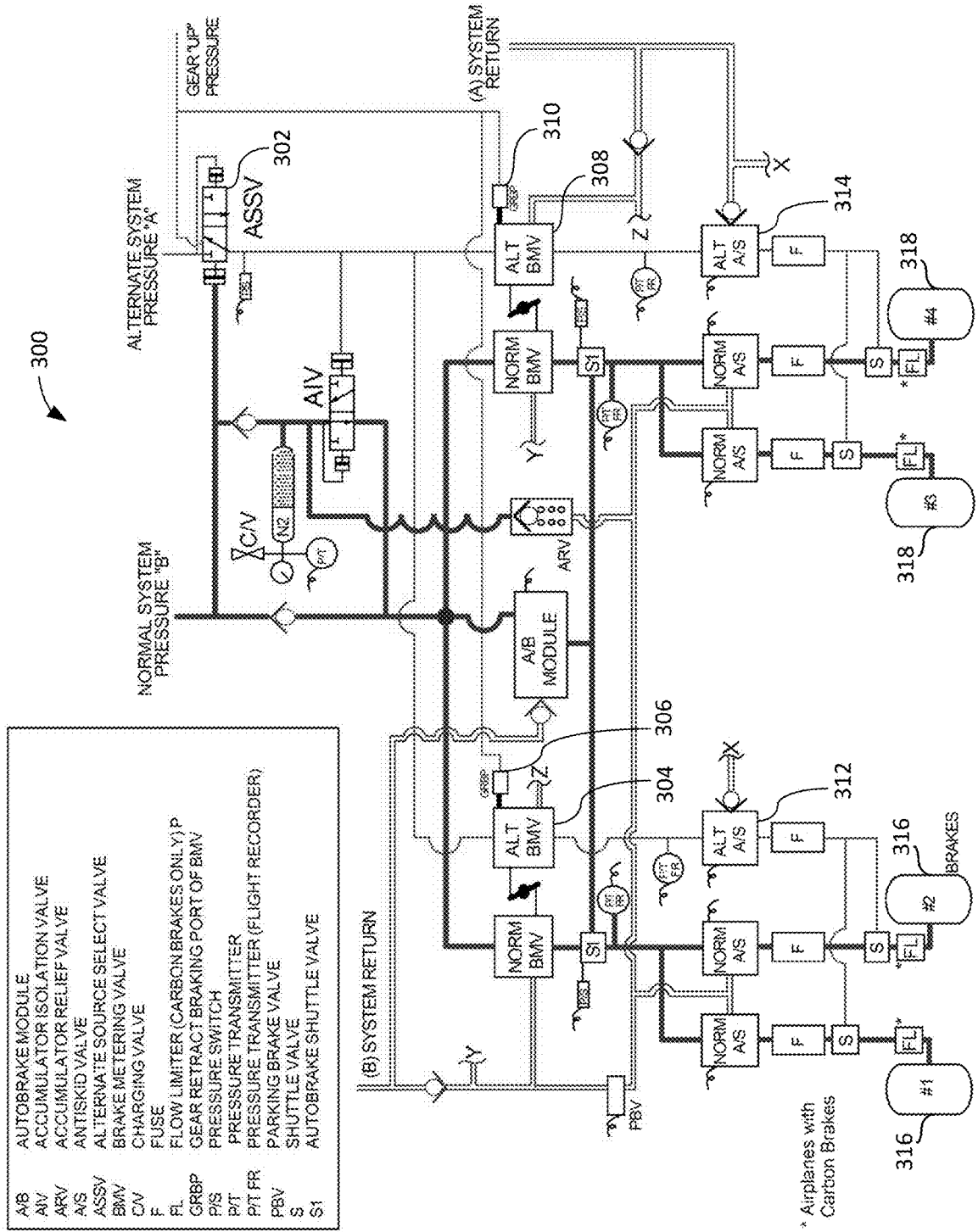
FIG. 3 is a schematic of a known hydraulic retract braking system.

FIG. 3 is a schematic of a known hydraulic retract braking system 300. The hydraulic retract braking system 300 of FIG. 3 may be implemented to provide retract braking to the first set of wheels 108 of the LMLG 106 and the second set of wheels 112 of the RMLG 110 of the aircraft 100 of FIG. 1 in connection with a landing gear retraction process. The hydraulic retract braking system 300 of FIG. 3 includes an alternate source select valve (ASSV) 302, a left alternate brake metering valve (left ALT BMV) 304 having a left gear retract braking port (left GRBP) 306, a right alternate brake metering valve (right ALT BMV) 308 having a right gear retract braking port (right GRBP) 310, a left alternate antiskid valve (left ALT A/S valve) 312, a right alternate antiskid valve (right ALT A/S valve) 314, left brakes 316, and right brakes 318. The left ALT A/S valve 312 is operatively positioned between the left ALT BMV 304 and the left brakes 316. The right ALT A/S valve 314 is operatively positioned between the right ALT BMV 308 and the right brakes 318. The left brakes 316 may be operatively coupled to the first set of wheels 108 of the LMLG 106 of FIG. 1, and the right brakes 318 may be operatively coupled to the second set of wheels 112 of the RMLG 110 of FIG. 1. In such an example, application of the left brakes 316 decelerates and/or despins the first set of wheels 108 of the LMLG 106 of FIG. 1, and application of the right brakes 318 decelerates and/or despins the second set of wheels 112 of the RMLG 110 of FIG. 1.

A flow control member of the ASSV 302 of FIG. 3 is movable and/or actuatable between the first ASSV control position shown in FIG. 3 and a second ASSV control position. The flow control member of the ASSV 302 of FIG. 3 is hydraulically biased via the normal "B" system pressure into the first control position shown in FIG. 3, and remains in the first control position absent a loss of pressure and/or a hydraulic failure of the normal "B" system. When the flow control member of the ASSV 302 of FIG. 3 is in the first control position shown in FIG. 3, a gear "UP" pressure conduit is in fluid communication with and/or is ported to an alternate "A" system supply conduit. The gear "UP" pressure conduit may be pressurized in response to the landing gear lever of the aircraft being moved from a "DOWN" position into an "UP" position.

The alternate "A" system pressure shown in FIG. 3 passes through the ASSV 302 and is routed to the left ALT BMV 304 and the right ALT BMV 308. The alternate "A" system pressure is prevented from flowing past the left ALT BMV 304 and right ALT BMV 308 until the gear "UP" pressure (which is at the alternate "A" system pressure) pressurizes the alternate (e.g., retract) brake system and hydraulically actuates the left GRBP 306 and the right GRBP 310. The pressurized left GRBP 306 and right GRBP 310, in turn, cause the left ALT BMV 304 and the right ALT BMV 308 to meter sufficient alternate "A" system pressure to the left ALT A/S valve 312 and the right ALT A/S valve 314 to decelerate and/or despin, via the left brakes 316 and the right brakes 318, the wheels of the landing gear (e.g., the first set of wheels 108 of the LMLG 106 and/or the second set of wheels 112 of the RMLG 110 of FIG. 1) that are operatively coupled to the hydraulic retract braking system 300 of FIG. 3.

Figure 4:
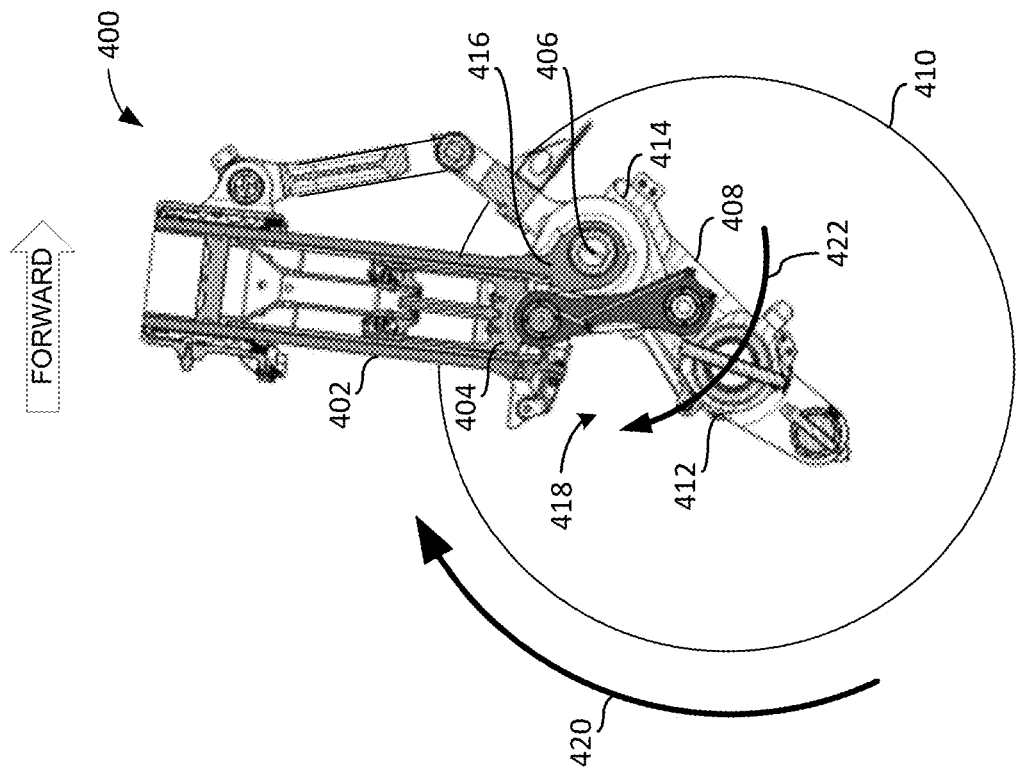
FIG. 4 is a cross-sectional view of an example landing gear constructed in accordance with the teachings of this disclosure.

FIG. 4 is a cross-sectional view of an example landing gear 400 constructed in accordance with the teachings of this disclosure. In some examples, the LMLG 106 and/or the RMLG 110 of FIGS. 1 and 2 may be implemented via the landing gear 400 of FIG. 4. The landing gear 400 of FIG. 4 includes an example upper strut inner cylinder 402, an example lower strut 404, an example pivot pin 406, an example lower link 408, and an example wheel 410. While a single wheel 410 is shown in FIG. 4, the landing gear 400 may include additional wheels (e.g., a second wheel, etc.) forming a set of wheels (e.g., similar to the first set off wheels 108 and/or the second set of wheels 112 shown in FIGS. 1 and 2). In the illustrated example of FIG. 4, the lower strut 404 is slidable within the upper strut inner cylinder 402. The lower link 408 includes a first example end 412 and a second example end 414 located opposite the first end 412. The wheel 410 is rotatably coupled to the first end 412 of the lower link 408. The second end 414 of the lower link 408 is pivotably coupled to a first example end 416 of the upper strut inner cylinder 402 via the pivot pin 406. The lower link 408 is accordingly movable and/or pivotable relative to the upper strut inner cylinder 402 about the pivot pin 406.

Figure 5:
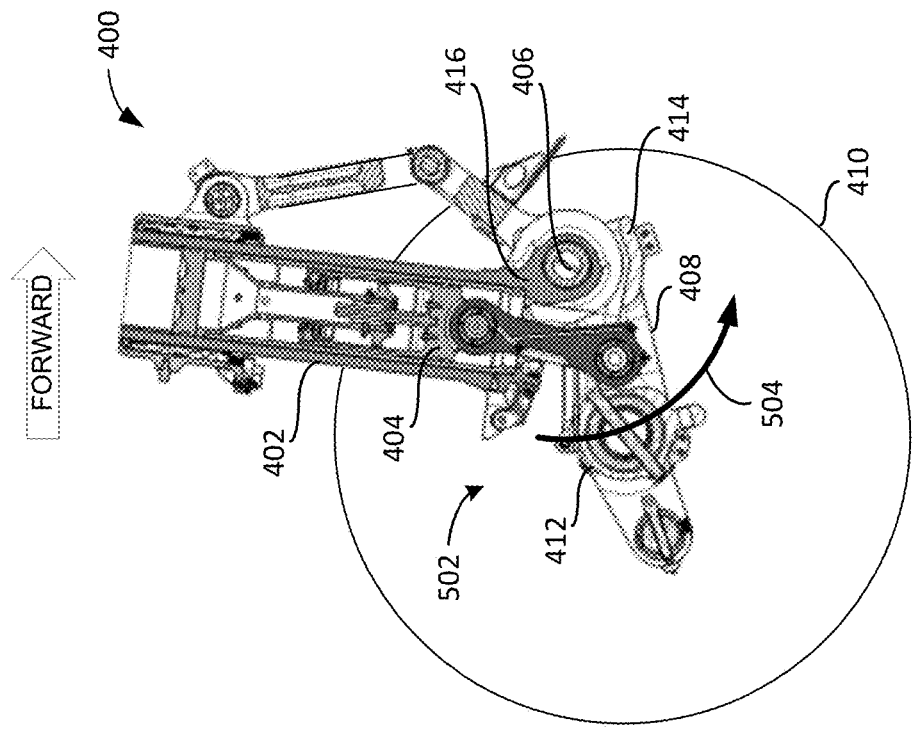
FIG. 5 is a cross-sectional view of the example lower link of the example landing gear of FIG. 4 in a second example position relative to the example upper strut inner cylinder of the example landing gear of FIG. 4.

In the illustrated example of FIG. 4, the lower link 408 of the landing gear 400 is in a first example position 418 relative to the upper strut inner cylinder 402 of the landing gear 400. FIG. 5 is a cross-sectional view of the example lower link 408 of the example landing gear 400 of FIG. 4 in a second example position 502 relative to the example upper strut inner cylinder 402 of the example landing gear 400. The first position 418 of the lower link 408 corresponds to a position of the lower link 408 following (e.g., immediately after) separation of the wheel 410 from the ground during takeoff of an aircraft implementing the landing gear 400 (e.g., the aircraft 100 of FIG. 1), and prior to the initiation of a retract braking process to be applied to the wheel 410 of the landing gear 400. The second position 502 of the lower link 408 corresponds to a position of the lower link 408 following completion of the retract braking process.

When the lower link 408 is in the first position 418 shown in FIG. 4, the wheel 410 rotates and/or spins at a first rate (e.g., 1800 rpm) in a first example direction 420 (e.g., clockwise) about the first end 412 of the lower link 408. Application of the retract braking process (e.g., via the hydraulic retract braking system 300 of FIG. 3) to the wheel 410 causes the rate of rotation and/or spinning of the wheel 410 to be reduced such that the wheel 410 is decelerated and/or despun from the first rate to a second rate (e.g., 0 rpm). As the retract braking process occurs, the deceleration and/or despin of the wheel 410 from the first rate to the second rate generates an example applied moment 422 that causes the lower link 408 to move in the first direction 420 from the first position 418 of FIG. 4 to the second position 502 of FIG. 5. When the retract braking process is complete, the lower link 408 returns and/or rebounds in a second example direction 504 (e.g., counterclockwise) opposite the first direction 420 from the second position 502 of FIG. 5 to the first position 418 of FIG. 4.

Figure 6:
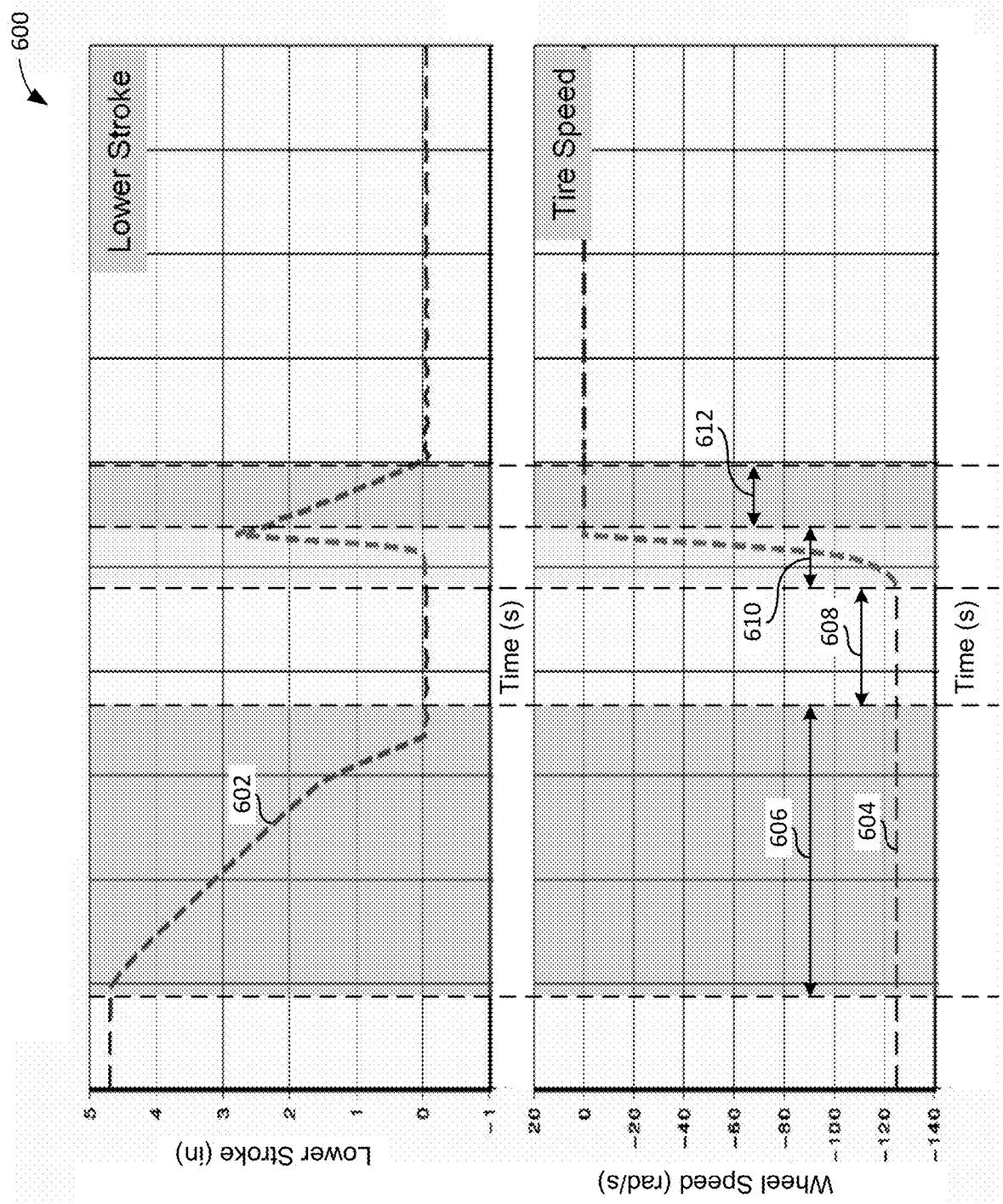
FIG. 6 is an example graph including a first example plot of strut stroke versus time and a second example plot of wheel speed versus time.

FIG. 6 is an example graph 600 including a first example plot 602 of strut stroke versus time and a second example plot 604 of wheel speed versus time. The time axis includes an example takeoff period 606, an example evaluation period 608 following the takeoff period 606, an example retract braking period 610 following the evaluation period 608, and an example rebound period 612 following the retract braking period 610. The duration(s) and/or relative timing of respective ones of the takeoff period 606, the evaluation period 608, the retract braking period 610, and/or the rebound period 612 may differ from that shown in the graph 600 of FIG. 6.

In the illustrated example of FIG. 6, the transition between the end of the takeoff period 606 and the beginning of the evaluation period 608 is indicative of the point in time at which a transition from ground mode to air mode occurs (e.g., the point in time at which the wheels of the aircraft are no longer in contact with the ground surface). The transition between the end of the evaluation period 608 and the beginning of the retract braking period 610 is indicative of the point in time at which the landing gear lever of the aircraft is moved from the "DOWN" position into the "UP" position. The evaluation period 608 accordingly corresponds to the human and/or pilot response time associated with ascertaining (e.g., physically determining) that the aircraft is airborne (e.g., that no landing gear of the aircraft is in contact with a ground surface and a positive rate of climb has been established) and thereafter actuating the landing gear lever into the "UP" position. In some examples, the evaluation period 608 of FIG. 6 may have a duration of three seconds or more.

As shown in the first plot 602 of the illustrated example of FIG. 6, the strut stroke decreases from a maximum value to a minimum value during the takeoff period 606. The strut stroke maintains the minimum value during the evaluation period 608. The strut stroke increases from the minimum value to an increased value during the retract braking period 610. The strut stroke returns from the increased value to the minimum value during the rebound period 612. Repeated cycling of the strut stroke from the minimum value to the increased value and back to the minimum value may fatigue the struts and/or links of the landing gear (e.g., the lower strut 404 and/or the lower link 408 of the landing gear 400 of FIG. 4). Furthermore, the struts, links, and/or wheels may be misaligned relative to a well of an aircraft (e.g., the wells 114, 116 of the aircraft 100 of FIG. 1) prior to the end of the rebound period 612 of FIG. 6.

As further shown in the second plot 604 of the illustrated example of FIG. 6, the wheel speed maintains a maximum value during the takeoff period 606. The wheel speed further maintains the maximum value during the evaluation period 608. The wheel speed decreases from the maximum value to a minimum value during the retract braking period 610. The wheel speed maintains the minimum value during the rebound period 612. In the illustrated example of FIG. 6, the initiation of the deceleration of the wheel of the landing gear (e.g., the wheel 410 of the landing gear 400 of FIG. 4) does not begin until the evaluation period 608 has concluded.

Figure 7:
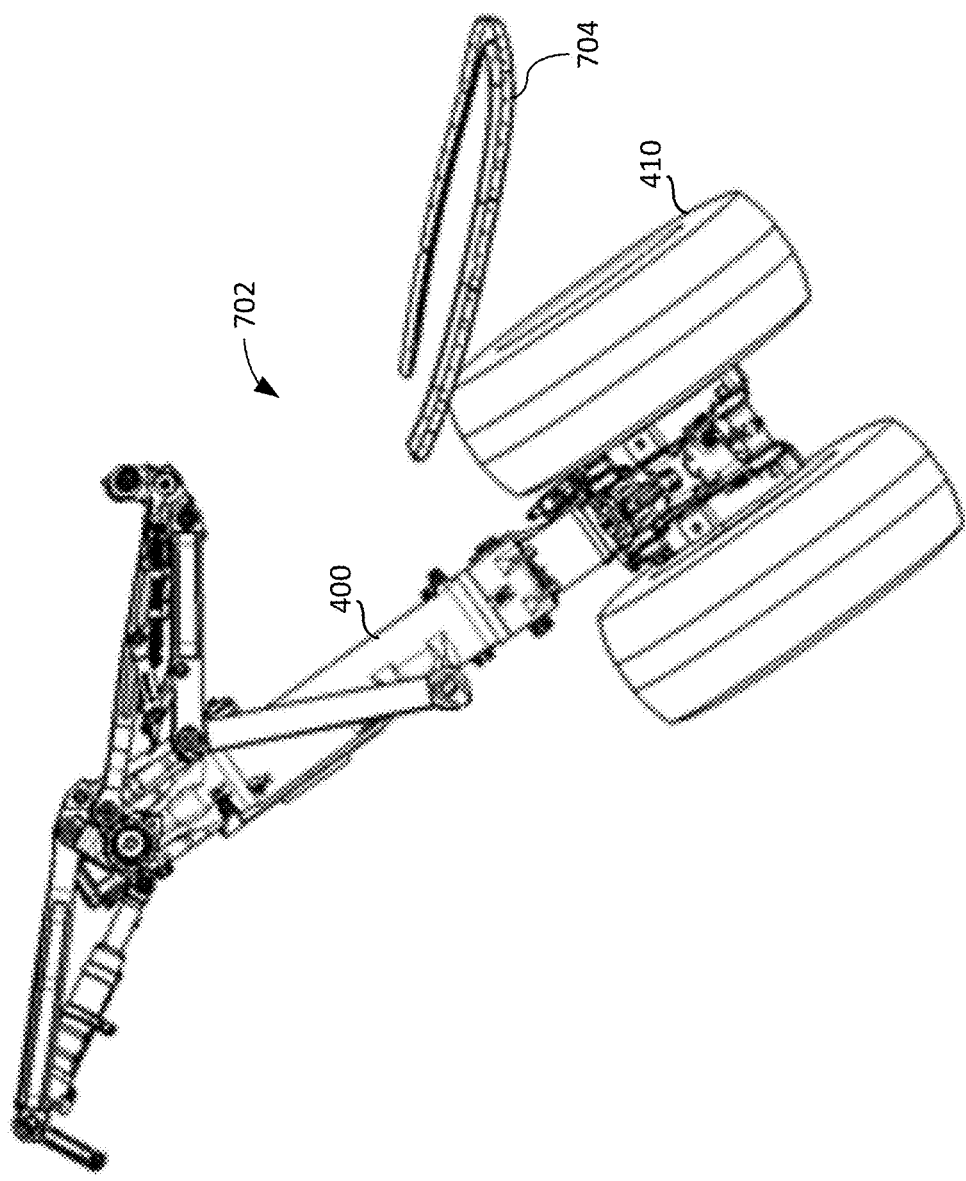
FIG. 7 illustrates the example landing gear of FIGS. 4 and 5 in an example partially retracted position associated with an example landing gear retraction process.

FIG. 7 illustrates the example landing gear 400 of FIGS. 4 and 5 in an example partially retracted position 702 associated with an example landing gear retraction process. In the illustrated example of FIG. 7, the partially retracted position 702 corresponds to a position at which the wheel 410 of the landing gear 400 reaches an example fairing 704 surrounding a well of an aircraft (e.g., a wing-to-body fairing surrounding the well 114 of the aircraft 100) as the landing gear 400 moves from a deployed position (e.g., the deployed position 202 of FIG. 2) to a retracted position (e.g., the retracted position 204 of FIG. 2).

In some examples, it may be desirable for completion of the retract braking process discussed above in connection with FIGS. 3-6 to occur before the wheel 410 of the landing gear 400 reaches the fairing 704 of FIG. 7. For example, if the wheel 410 of the landing gear 400 remains spinning as the wheel 410 reaches the fairing 704, flailing tread and/or carcass of the wheel 410 associated with the spinning may collide with the fairing 704, potentially causing damage to the wheel 410 and/or the fairing 704. Furthermore, vibration associated with the prolonged spinning of an unevenly worn tire of the wheel 410 may result in undesirable noise and/or vibration in a cabin of the aircraft (e.g., an area where passengers may be seated). In some examples, it may also be desirable for the lower link 408 of the landing gear 400 to return and/or rebound from the second position 502 of FIG. 5 to the first position 416 of FIG. 4 before the wheel 410 of the landing gear 400 reaches the fairing 704 of FIG. 7. For example, if the wheel 410 of the landing gear 400 has not fully returned and/or rebounded as the wheel 410 reaches the fairing 704, the out of position wheel 410 may collide with the fairing 704, potentially causing damage to a tire of the wheel 410 and/or to the fairing 704. It may accordingly be advantageous for the retract braking and rebound processes described above in connection with FIGS. 3-6 to be complete before the wheel 410 of the landing gear 400 reaches the fairing 704 of FIG. 7. It may additionally or alternatively be advantageous to reduce the extent of the applied moment and the corresponding extent of the rebound associated with the landing gear 400.

The example retract braking control systems disclosed herein provide modulated wheel deceleration control in connection with the retract braking of the first set of wheels 108 of the LMLG 106 and/or the second set of wheels 112 of the RMLG 110 of the aircraft 100 of FIG. 1. In some disclosed examples, an active, modulated wheel deceleration process is implemented based on wheel speed data obtained from wheel speed sensors operatively coupled to the first set of wheels 108 of the LMLG 106 and/or the second set of wheels 112 of the RMLG 110. In response to the wheel speed data indicating an excessive rate of wheel deceleration, antiskid valves may be actuated to release brake pressure being applied to the wheels in connection with the retract braking process. Modulating wheel deceleration in connection with the retract braking process and/or during a landing gear retraction process advantageously reduces the extent of the applied deceleration moment and the resulting rebound that may otherwise be more significant when the wheels are rapidly decelerated and/or when the deceleration of the wheels is not actively regulated. The disclosed retract braking control systems accordingly reduce the likelihood of the first set of wheels 108 of the LMLG 106 and/or the second set of wheels 112 of the RMLG 110 of the aircraft 100 of FIG. 1 colliding with wing-to-body fairings surrounding the wells 114, 116 of the aircraft 100 of FIG. 1 in connection with the landing gear retraction process. The disclosed retract braking control systems also reduce fatigue on the struts and/or links of the LMLG 106 and the RMLG 110.

Figure 8:
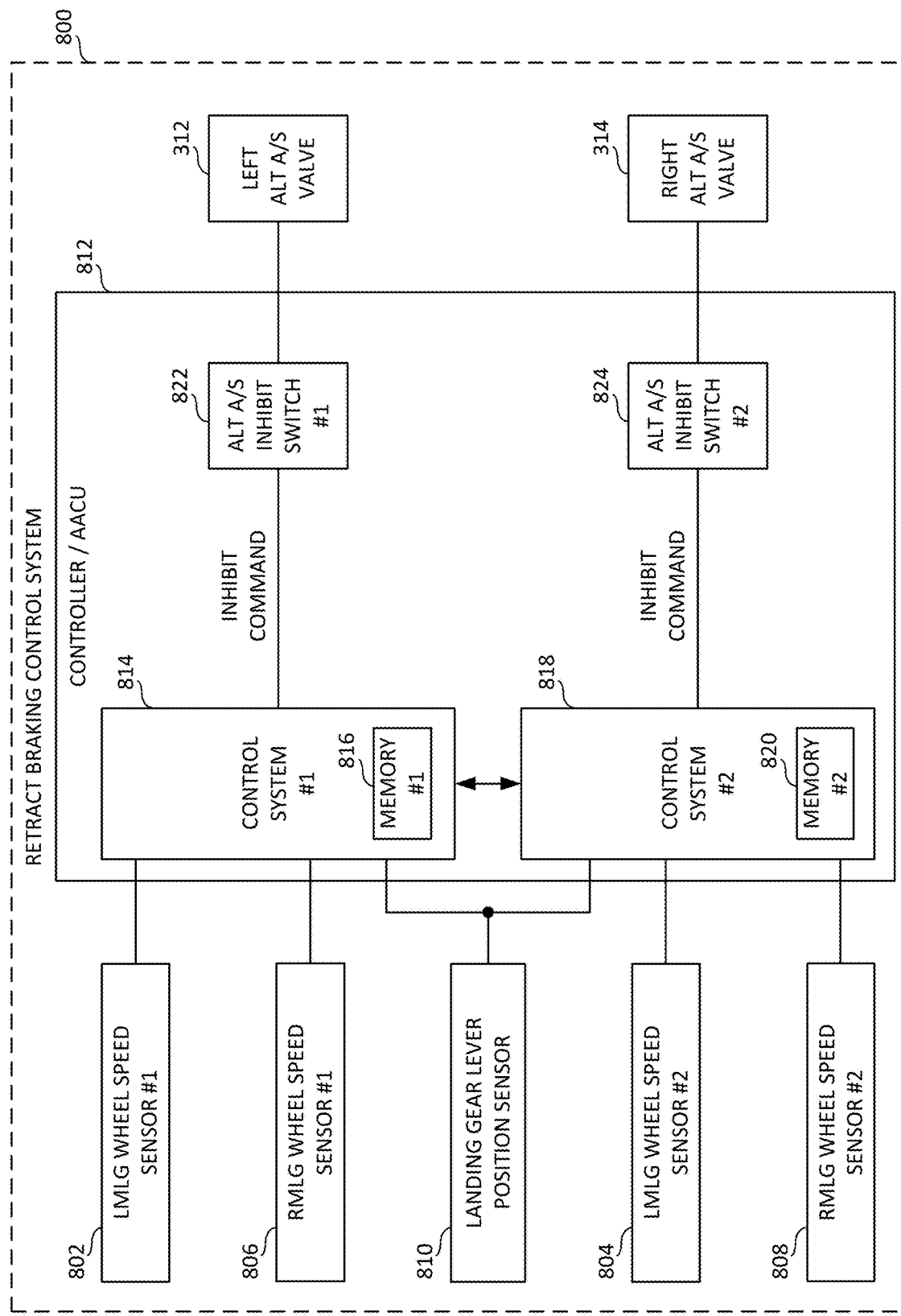
FIG. 8 is a block diagram of an example retract braking control system constructed in accordance with the teachings of this disclosure.

FIG. 8 is a block diagram of an example retract braking control system 800 constructed in accordance with the teachings of this disclosure. The retract braking control system 800 of FIG. 8 includes a first example LMLG wheel speed sensor 802, a second example LMLG wheel speed sensor 804, a first example RMLG wheel speed sensor 806, a second example RMLG wheel speed sensor 808, an example landing gear lever position sensor 810, an example controller 812, a first example control system 814, a first example memory 816, a second example control system 818, a second example memory 820, a first example alternate antiskid inhibit switch (first ALT A/S inhibit switch) 822, a second example alternate antiskid inhibit switch (second ALT A/S inhibit switch) 824, the left ALT A/S valve 312, and the right ALT A/S valve 314.

In some examples, the controller 812 of FIG. 8 may be implemented at and/or as an antiskid and autobrake control unit (AACU) of the retract braking control system 800 of FIG. 8. In some such examples, the first control system 814 of the controller 812 of FIG. 8 may be implemented as a first control card of the AACU, and the second control system 818 of the controller 812 of FIG. 8 may be implemented as a second control card of the AACU. In some examples, the first and second control cards may be digital control cards, and the AACU may be a digital controller. In some examples, the first and second digital control cards may transfer data between one another via a digital communication bus.

In the illustrated example of FIG. 8, the first LMLG wheel speed sensor 802, the first RMLG wheel speed sensor 806, and the landing gear lever position sensor 810 of FIG. 8 are operatively coupled to the first control system 814, and/or, more generally, to the controller 812 of FIG. 8. The second LMLG wheel speed sensor 804, the second RMLG wheel speed sensor 808, and the landing gear lever position sensor 810 of FIG. 8 are operatively coupled to the second control system 818, and/or, more generally, to the controller 812 of FIG. 8. The first control system 814 of FIG. 8 is operatively coupled to the second control system 818 and to the first ALT A/S inhibit switch 822 of FIG. 8. The second control system 818 of FIG. 8 is operatively coupled to the first control system 814 and to the second ALT A/S inhibit switch 824 of FIG. 8. The first ALT A/S inhibit switch 822 of FIG. 8 is operatively coupled to the left ALT A/S valve 312 of FIG. 8. The second ALT A/S inhibit switch 824 of FIG. 8 is operatively coupled to the right ALT A/S valve 314 of FIG. 8.

The first LMLG wheel speed sensor 802 of FIG. 8 senses and/or detects a speed (e.g., an angular or rotational velocity) of a first wheel (e.g., an inboard wheel) included among the first set of wheels 108 of the LMLG 106 of FIG. 1 (e.g., first LMLG wheel speed data). In some examples, the first LMLG wheel speed sensor 802 of FIG. 8 may sense and/or detect whether the speed of the first wheel exceeds a wheel speed threshold (e.g., wheel speed threshold data). The first LMLG wheel speed sensor 802 of FIG. 8 is located, mounted on, and/or otherwise structurally coupled to the first set of wheels 108 of the LMLG 106 of FIG. 1, and operatively coupled to the first control system 814, the first memory 816, and/or, more generally, the controller 812 of FIG. 8.

First LMLG wheel speed data sensed, measured and/or detected by the first LMLG wheel speed sensor 802 of FIG. 8 may be stored in the first memory 816 of FIG. 8, and may be accessed by the first control system 814 and/or, more generally, by the controller 812 of FIG. 8 either from the first memory 816 of FIG. 8 or directly from the first LMLG wheel speed sensor 802 of FIG. 8. In some examples, the first LMLG wheel speed sensor 802 of FIG. 8 may constantly sense and/or constantly detect the first LMLG wheel speed data. In other examples, the first LMLG wheel speed sensor 802 of FIG. 8 may periodically sense and/or periodically detect the first LMLG wheel speed data based on a timing interval and/or a sampling frequency implemented via the first control system 814 and/or the controller 812 of FIG. 8.

The second LMLG wheel speed sensor 804 of FIG. 8 senses and/or detects a speed (e.g., an angular or rotational velocity) of a second wheel (e.g., an outboard wheel) included among the first set of wheels 108 of the LMLG 106 of FIG. 1 (e.g., second LMLG wheel speed data). In some examples, the second LMLG wheel speed sensor 804 of FIG. 8 may sense and/or detect whether the speed of the second wheel exceeds a wheel speed threshold (e.g., wheel speed threshold data). The second LMLG wheel speed sensor 804 of FIG. 8 is located, mounted on, and/or otherwise structurally coupled to the first set of wheels 108 of the LMLG 106 of FIG. 1, and operatively coupled to the second control system 818, the second memory 820, and/or, more generally, the controller 812 of FIG. 8.

Second LMLG wheel speed data sensed, measured and/or detected by the second LMLG wheel speed sensor 804 of FIG. 8 may be stored in the second memory 820 of FIG. 8, and may be accessed by the second control system 818 and/or, more generally, by the controller 812 of FIG. 8 either from the second memory 820 of FIG. 8 or directly from the second LMLG wheel speed sensor 804 of FIG. 8. In some examples, the second LMLG wheel speed data is transferred (e.g., via a digital communication bus) from the second memory 820 and/or the second control system 818 of FIG. 8 to the first memory 816 and/or the first control system 814 of FIG. 8. In some examples, the second LMLG wheel speed sensor 804 of FIG. 8 may constantly sense and/or constantly detect the second LMLG wheel speed data. In other examples, the second LMLG wheel speed sensor 804 of FIG. 8 may periodically sense and/or periodically detect the second LMLG wheel speed data based on a timing interval and/or a sampling frequency implemented via the second control system 818 and/or the controller 812 of FIG. 8.

The first RMLG wheel speed sensor 806 of FIG. 8 senses and/or detects a speed (e.g., an angular or rotational velocity) of a first wheel (e.g., an inboard wheel) included among the second set of wheels 112 of the RMLG 110 of FIG. 1 (e.g., first RMLG wheel speed data). In some examples, the first RMLG wheel speed sensor 806 of FIG. 8 may sense and/or detect whether the speed of the first wheel exceeds a wheel speed threshold (e.g., wheel speed threshold data). The first RMLG wheel speed sensor 806 of FIG. 8 is located, mounted on, and/or otherwise structurally coupled to the second set of wheels 112 of the RMLG 110 of FIG. 1, and operatively coupled to the first control system 814, the first memory 816, and/or, more generally, the controller 812 of FIG. 8.

First RMLG wheel speed data sensed, measured and/or detected by the first RMLG wheel speed sensor 806 of FIG. 8 may be stored in the first memory 816 of FIG. 8, and may be accessed by the first control system 814 and/or, more generally, by the controller 812 of FIG. 8 either from the first memory 816 of FIG. 8 or directly from the first RMLG wheel speed sensor 806 of FIG. 8. In some examples, the first RMLG wheel speed data is transferred (e.g., via a digital communication bus) from the first memory 816 and/or the first control system 814 of FIG. 8 to the second memory 820 and/or the second control system 818 of FIG. 8. In some examples, the first RMLG wheel speed sensor 806 of FIG. 8 may constantly sense and/or constantly detect the first RMLG wheel speed data. In other examples, the first RMLG wheel speed sensor 806 of FIG. 8 may periodically sense and/or periodically detect the first RMLG wheel speed data based on a timing interval and/or a sampling frequency implemented via the first control system 814 and/or the controller 812 of FIG. 8.

The second RMLG wheel speed sensor 808 of FIG. 8 senses and/or detects a speed (e.g., an angular or rotational velocity) of a second wheel included among the second set of wheels 112 of the RMLG 110 of FIG. 1 (e.g., second RMLG wheel speed data). In some examples, the second RMLG wheel speed sensor 808 of FIG. 8 may sense and/or detect whether the speed of the second wheel exceeds a wheel speed threshold (e.g., wheel speed threshold data). The second RMLG wheel speed sensor 808 of FIG. 8 is located, mounted on, and/or otherwise structurally coupled to the second set of wheels 112 of the RMLG 110 of FIG. 1, and operatively coupled to the second control system 818, the second memory 820, and/or, more generally, the controller 812 of FIG. 8.

Second RMLG wheel speed data sensed, measured and/or detected by the second RMLG wheel speed sensor 808 of FIG. 8 may be stored in the second memory 820 of FIG. 8, and may be accessed by the second control system 818 and/or, more generally, by the controller 812 of FIG. 8 either from the second memory 820 of FIG. 8 or directly from the second RMLG wheel speed sensor 808 of FIG. 8. In some examples, the second RMLG wheel speed sensor 808 of FIG. 8 may constantly sense and/or constantly detect the second RMLG wheel speed data. In other examples, the second RMLG wheel speed sensor 808 of FIG. 8 may periodically sense and/or periodically detect the second RMLG wheel speed data based on a timing interval and/or a sampling frequency implemented via the second control system 818 and/or the controller 812 of FIG. 8.

The landing gear lever position sensor 810 of FIG. 8 senses, measures and/or detects a position (e.g., an up position or a down position) of a landing gear lever of the aircraft 100 of FIG. 1 (e.g., landing gear lever position data). The landing gear lever position sensor 810 of FIG. 8 is operatively coupled to a landing gear lever located within a cockpit of the aircraft 100 of FIG. 1, and is also operatively coupled to the first control system 814, the first memory 816, the second control system 818, the second memory 820, and/or, more generally, the controller 812 of FIG. 8.

Landing gear lever position data sensed, measured and/or detected by the landing gear lever position sensor 810 of FIG. 8 may be stored in the first memory 816 and/or the second memory 820 of FIG. 8, and may be accessed by the first control system 814, the second control system 818, and/or, more generally, by the controller 812 of FIG. 8 from either the first memory 816 or the second memory 820 of FIG. 8, or directly from the landing gear lever position sensor 810 of FIG. 8. In some examples, the landing gear lever position sensor 810 of FIG. 8 may constantly sense and/or constantly detect the landing gear lever position data. In other examples, the landing gear lever position sensor 810 of FIG. 8 may periodically sense and/or periodically detect the landing gear lever position data based on a timing interval and/or a sampling frequency implemented via the first control system 814, the second control system 818, and/or the controller 812 of FIG. 8.

In other examples (e.g., in examples where the aircraft 100 of FIG. 1 is an unmanned and/or autonomous aircraft), the landing gear lever position sensor 810 of FIG. 8 may be operatively coupled to a landing gear position manager (e.g., a programmable processor) instead of a landing gear lever. In such examples, the landing gear lever position sensor 810 of FIG. 8 may sense, measure and/or detect a landing gear position input corresponding to a remotely programmed, commanded, and/or set state of the landing gear position manager, as described above. The examples provided herein relative to the landing gear lever position sensor 810 of FIG. 8 sensing, measuring and/or detecting a position of a landing gear lever of the aircraft 100 of FIG. 1 should accordingly be understood to alternatively apply to the landing gear lever position sensor 810 sensing, measuring and/or detecting a landing gear position input corresponding to a remotely programmed, commanded, and/or set state of the landing gear position manager.

The first control system 814 of FIG. 8 may be implemented by a semiconductor device such as a processor, microprocessor, controller or microcontroller. In the illustrated example of FIG. 8, the first control system 814 executes, implements, and/or manages one or more control loop(s) to control the first ALT A/S inhibit switch 822, and/or to control the retract braking pressure passing through the left ALT A/S valve 312 to the left brakes 316. In some examples, the control loop(s) implemented via the first control system 814 of FIG. 8 may be based on wheel speed data (e.g., first LMLG wheel speed data and second LMLG wheel speed data) and landing gear lever position data received, obtained and/or accessed by the first control system 814 directly from the first LMLG wheel speed sensor 802 and the landing gear lever position sensor 810 of FIG. 8, and indirectly from the second LMLG wheel speed sensor 804 via the second control system 818 of FIG. 8. As discussed above, the first control system 814 and the second control system 818 of FIG. 8 are capable of exchanging data with one another via a communication bus (e.g., a digital communication bus). Example control loops implemented via the first control system 814 of FIG. 8 are further discussed below in connection with FIGS. 10-13.

In some examples, the first control system 814 of FIG. 8 determines whether the landing gear lever position data sensed and/or detected via the landing gear lever position sensor 810 of FIG. 8 is indicative of the landing gear lever of the aircraft 100 of FIG. 1 transitioning from a "DOWN" position into a "UP" position. In some examples, the first control system 814 of FIG. 8 determines a left summed wheel speed (e.g., left summed wheel speed data) based on the first LMLG wheel speed data sensed and/or detected via the first LMLG wheel speed sensor 802 of FIG. 8, and further based on the second LMLG wheel speed data sensed and/or detected via the second LMLG wheel speed sensor 804 of FIG. 8 and transferred to the first control system 814 from the second control system 818 of FIG. 8. In some examples, the first control system 814 of FIG. 8 determines whether the left summed wheel speed data satisfies (e.g., is less than) a wheel speed threshold. In some examples, the first control system 814 of FIG. 8 determines a rate of change of the left summed wheel speed data (e.g., left wheel deceleration data). In some examples, the first control system 814 of FIG. 8 determines whether the left wheel deceleration data satisfies (e.g., is greater than) a wheel deceleration threshold.

In the illustrated example of FIG. 8, the first control system 814 generate(s) one or more control signal(s) and/or command(s) (e.g., one or more inhibit command(s)) based on the left summed wheel speed data and/or the left wheel deceleration data to modulate a retract braking pressure provided and/or managed via the left ALT A/S valve 312. The control signal(s) and/or command(s) generated by the first control system 814 of FIG. 8 is/are transmitted to the first ALT A/S inhibit switch 822 of FIG. 8. In some examples, a first control signal generated by the first control system 814 of FIG. 8 instructs and/or commands the first ALT A/S inhibit switch 822 into a first position (e.g., an "ON" position). When the first ALT A/S inhibit switch 822 is in the first position, the first ALT A/S inhibit switch 822 generates and/or enables a first ALT A/S inhibit control signal that causes full antiskid current via the left ALT A/S valve 312 to release brake pressure from the left brakes 316. In some examples, a second control signal generated by the first control system 814 of FIG. 8 instructs and/or commands the first ALT A/S inhibit switch 822 into a second position (e.g., an "OFF" position). When the first ALT A/S inhibit switch 822 is in the second position, the first ALT A/S inhibit switch 822 generates and/or enables a second ALT A/S inhibit control signal that causes the left ALT A/S valve 312 to cease releasing brake pressure from the left brakes 316.

Cycling and or repeated actuation of the first ALT A/S inhibit switch 822 of FIG. 8 between the first and second positions (e.g., the "ON" and "OFF" positions) modulates the pressure of the hydraulic fluid supplied to the left brakes 316 via the left ALT A/S valve 312. The modulated brake pressure results in modulated deceleration of the first set of wheels 108 of the LMLG 106 of the aircraft 100 of FIG. 1. Modulating the deceleration of the wheels reduces the extent of the applied deceleration moment and the resulting rebound that may otherwise be more significant when the wheels are rapidly decelerated and/or when the deceleration of the wheels is not actively regulated. Modulating the deceleration of the wheels accordingly reduces reduce the likelihood of the wheels colliding with a wing-to-body fairing surrounding the first well 114 of the aircraft 100 in connection with the landing gear retraction process. Modulating the deceleration of the wheels also reduces fatigue on the struts and/or links of the LMLG 106 of the aircraft 100.

The first memory 816 of FIG. 8 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the first memory 816 may be stored in any file and/or data structure format, organization scheme, and/or arrangement.

Data and/or information received by the first control system 814 of FIG. 8 from the first LMLG wheel speed sensor 802, the first RMLG wheel speed sensor 806, the landing gear lever position sensor 810, and/or the second memory 820 of FIG. 8 may be stored in the first memory 816 of FIG. 8. Data and/or information corresponding to any of the above-described landing gear lever position data, first LMLG wheel speed data, first RMLG wheel speed data, second LMLG wheel speed data, left summed wheel speed data, wheel speed threshold, left wheel deceleration data, and/or wheel deceleration threshold may be stored in the first memory 816. Data and/or information stored in the first memory 816 is accessible to the first control system 814 and/or, more generally, to the controller 812 of FIG. 8. In some examples, data and/or information stored in the first memory 816 may be transferred to the second control system 818 and/or the second memory 820 of FIG. 8.

The second control system 818 of FIG. 8 may be implemented by a semiconductor device such as a processor, microprocessor, controller or microcontroller. In the illustrated example of FIG. 8, the second control system 818 executes, implements, and/or manages one or more control loop(s) to control the second ALT A/S inhibit switch 824, and/or to control the retract braking pressure passing through the right ALT A/S valve 314 to the right brakes 318. In some examples, the control loop(s) implemented via the second control system 818 of FIG. 8 may be based on wheel speed data (e.g., first RMLG wheel speed data and second RMLG wheel speed data) and landing gear lever position data received, obtained and/or accessed by the second control system 818 directly from the second RMLG wheel speed sensor 808 and the landing gear lever position sensor 810 of FIG. 8, and indirectly from the first RMLG wheel speed sensor 806 via the first control system 814 of FIG. 8. As discussed above, the second control system 818 and the first control system 814 of FIG. 8 are capable of exchanging data with one another via a communication bus (e.g., a digital communication bus). Example control loops implemented via the second control system 818 of FIG. 8 are further discussed below in connection with FIGS. 10-13.

In some examples, the second control system 818 of FIG. 8 determines whether the landing gear lever position data sensed and/or detected via the landing gear lever position sensor 810 of FIG. 8 is indicative of the landing gear lever of the aircraft 100 of FIG. 1 transitioning from a "DOWN" position into a "UP" position. In some examples, the second control system 818 of FIG. 8 determines a right summed wheel speed (e.g., right summed wheel speed data) based on the second RMLG wheel speed data sensed and/or detected via the second RMLG wheel speed sensor 808 of FIG. 8, and further based on the first RMLG wheel speed data sensed and/or detected via the first RMLG wheel speed sensor 806 of FIG. 8 and transferred to the second control system 818 from the first control system 814 of FIG. 8. In some examples, the second control system 818 of FIG. 8 determines whether the right summed wheel speed data satisfies (e.g., is less than) a wheel speed threshold. In some examples, the second control system 818 of FIG. 8 determines a rate of change of the right summed wheel speed data (e.g., right wheel deceleration data). In some examples, the second control system 818 of FIG. 8 determines whether the right wheel deceleration data satisfies (e.g., is greater than) a wheel deceleration threshold.

In the illustrated example of FIG. 8, the second control system 818 generate(s) one or more control signal(s) and/or command(s) (e.g., one or more inhibit command(s)) based on the right summed wheel speed data and/or the right wheel deceleration data to modulate a retract braking pressure provided and/or managed via the right ALT A/S valve 314. The control signal(s) and/or command(s) generated by the second control system 818 of FIG. 8 is/are transmitted to the second ALT A/S inhibit switch 824 of FIG. 8. In some examples, a first control signal generated by the second control system 818 of FIG. 8 instructs and/or commands the second ALT A/S inhibit switch 824 into a first position (e.g., an "ON" position). When the second ALT A/S inhibit switch 824 is in the first position, the second ALT A/S inhibit switch 824 generates and/or enables a first ALT A/S inhibit control signal that causes full antiskid current via the right ALT A/S valve 314 to release brake pressure from the right brakes 318. In some examples, a second control signal generated by the second control system 818 of FIG. 8 instructs and/or commands the second ALT A/S inhibit switch 824 into a second position (e.g., an "OFF" position). When the second ALT A/S inhibit switch 824 is in the second position, the second ALT A/S inhibit switch 824 generates and/or enables a second ALT A/S inhibit control signal that causes the right ALT A/S valve 314 to cease releasing brake pressure from the right brakes 318.

Cycling and or repeated actuation of the second ALT A/S inhibit switch 824 of FIG. 8 between the first and second positions (e.g., the "ON" and "OFF" positions) modulates the pressure of the hydraulic fluid supplied to the right brakes 318 via the right ALT A/S valve 314. The modulated brake pressure results in modulated deceleration of the second set of wheels 112 of the RMLG 110 of the aircraft 100 of FIG. 1. Modulating the deceleration of the wheels reduces the extent of the applied deceleration moment and the resulting rebound that may otherwise be more significant when the wheels are rapidly decelerated and/or when the deceleration of the wheels is not actively regulated. Modulating the deceleration of the wheels accordingly reduces reduce the likelihood of the wheels colliding with a wing-to-body fairing surrounding the second well 116 of the aircraft 100 in connection with the landing gear retraction process. Modulating the deceleration of the wheels also reduces fatigue on the struts and/or links of the RMLG 110 of the aircraft 100.

The second memory 820 of FIG. 8 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the second memory 820 may be stored in any file and/or data structure format, organization scheme, and/or arrangement.

Data and/or information received by the second control system 818 of FIG. 8 from the second LMLG wheel speed sensor 804, the second RMLG wheel speed sensor 808, the landing gear lever position sensor 810, and/or the first memory 816 of FIG. 8 may be stored in the second memory 820 of FIG. 8. Data and/or information corresponding to any of the above-described landing gear lever position data, first RMLG wheel speed data, second LMLG wheel speed data, second RMLG wheel speed data, right summed wheel speed data, wheel speed threshold, right wheel deceleration data, and/or wheel deceleration threshold may be stored in the second memory 820. Data and/or information stored in the second memory 820 is accessible to the second control system 818 and/or, more generally, to the controller 812 of FIG. 8. In some examples, data and/or information stored in the second memory 820 may be transferred to the first control system 814 and/or the first memory 816 of FIG. 8.

Figure 9A:
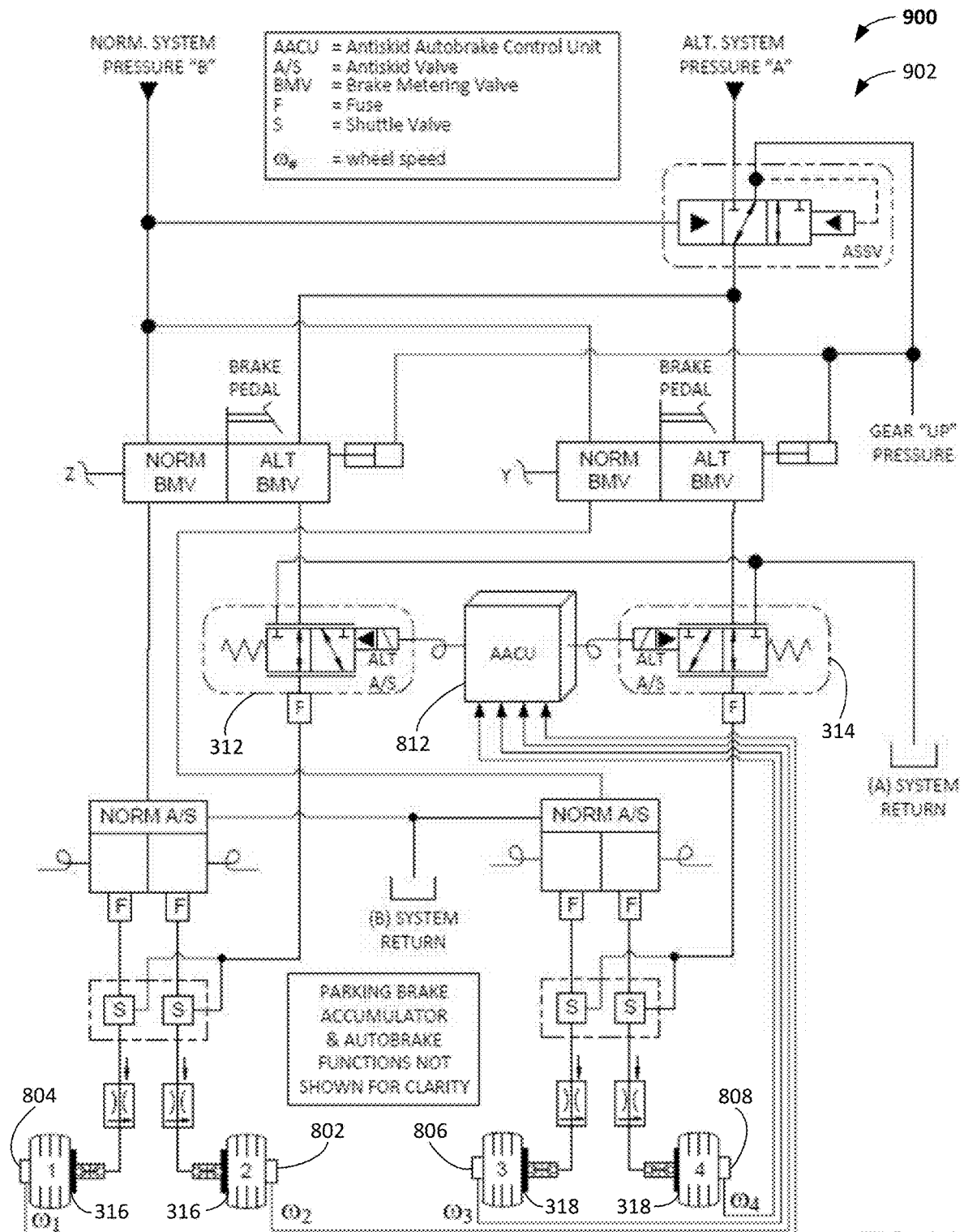
FIG. 9A is a schematic illustrating an example first state of an example modification to the hydraulic retract braking system of FIG. 3 to implement the example retract braking control system of FIG. 8.
Figure 9B:
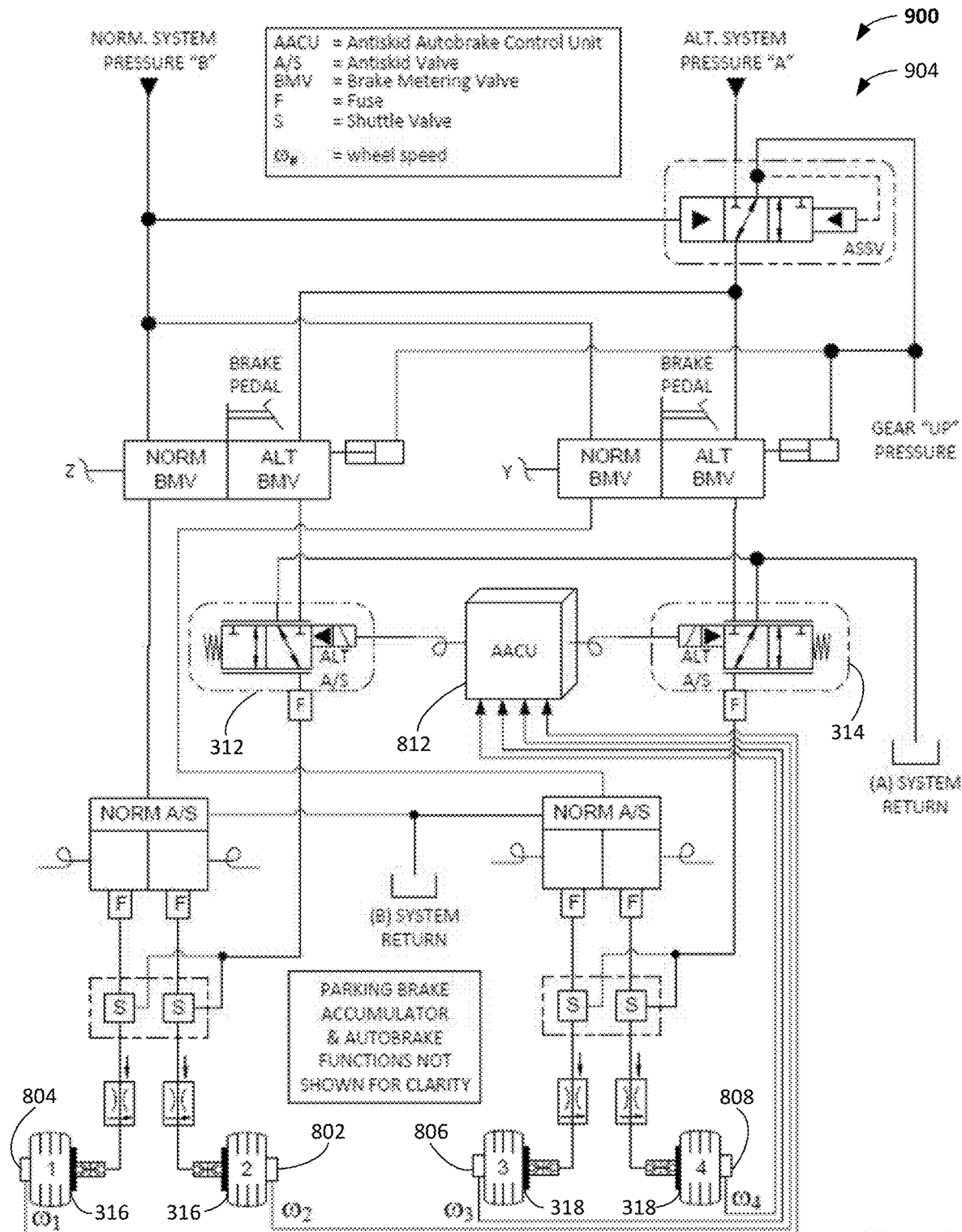
FIG. 9B is a schematic illustrating an example second state of the example modification of FIG. 9A.

FIG. 9A is a schematic illustrating an example first state 902 of an example modification 900 to the hydraulic retract braking system 300 of FIG. 3 to implement the example retract braking control system 800 of FIG. 8. FIG. 9B is a schematic illustrating an example second state 904 of the example modification 900 of FIG. 9A. The modification 900 of FIGS. 9A and 9B illustrates the incorporation of the first LMLG wheel speed sensor 802, the second LMLG wheel speed sensor 804, the first RMLG wheel speed sensor 806, the second RMLG wheel speed sensor 808, and the controller 812 of the retract braking control system 800 of FIG. 8 into the hydraulic retract braking system 300.

In the illustrated example of FIGS. 9A and 9B, the controller 812 is implemented at and/or as the AACU discussed above in connection with FIG. 8. The controller 812 and/or, more generally, the AACU is/are operatively coupled to respective ones of the left ALT A/S valve 312 and the right ALT A/S valve 314. The controller 812 and/or, more generally, the AACU is also operatively coupled to respective ones of the first LMLG wheel speed sensor 802, the second LMLG wheel speed sensor 804, the first RMLG wheel speed sensor 806, the second RMLG wheel speed sensor 808. The first LMLG wheel speed sensor 802 and the second LMLG wheel speed sensor 804 of FIGS. 9A and 9B may be operatively coupled, respectively, to an inboard wheel and an outboard wheel of the first set of wheels 108 of the LMLG 106 of FIG. 1. Similarly, the first RMLG wheel speed sensor 806 and the second RMLG wheel speed sensor 808 of FIGS. 9A and 9B may be operatively coupled, respectively, to an inboard wheel and an outboard wheel of the second set of wheels 112 of the RMLG 110 of FIG. 1.

In the illustrated example of FIGS. 9A and 9B, respective flow control members of the left ALT A/S valve 312 and the right ALT A/S valve 314 are electrically movable and/or actuatable between the first control position shown in FIG. 9A and the second flow control position shown in FIG. 9B. In some examples, the respective flow control members of the left ALT A/S valve 312 and the right ALT A/S valve 314 are electrically movable and/or actuatable between the first control position and the second control position in response to one or more control signal(s) (e.g., one or more inhibit command(s)) generated by the controller 812 and/or, more generally, by the AACU of FIG. 9. The left brakes 316 and the right brakes 318 are hydraulically pressurized when the respective flow control members of the left ALT A/S valve 312 and the right ALT A/S valve 314 are in the first control position shown in FIG. 9A. Hydraulic pressure from the left brakes 316 and the right brakes 318 is ported to a return line when the respective flow control members of the left ALT A/S valve 312 and the right ALT A/S valve 314 are in the second control position shown in FIG. 9B.

Cycling and or repeated actuation of the respective flow control members of the left ALT A/S valve 312 and the right ALT A/S valve 314 between the first control position of FIG. 9A and the second control position of FIG. 9B modulates the pressure of the hydraulic fluid supplied to the left brakes 316 and the right brakes 318 via corresponding ones of the left ALT A/S valve 312 and the right ALT A/S valve 314. The modulated pressure results in modulated deceleration of the wheels of the aircraft (e.g., the first set of wheels 108 of the LMLG 106 and/or the second set of wheels 112 of the RMLG 110 of the aircraft 100 of FIG. 1). Modulating the deceleration of the wheels reduces the extent of the applied deceleration moment and the resulting rebound that may otherwise be more significant when the wheels are rapidly decelerated and/or when the deceleration of the wheels is not actively regulated. Modulating the deceleration of the wheels accordingly reduces reduce the likelihood of the wheels colliding with wing-to-body fairings surrounding wells of the aircraft in connection with the landing gear retraction process. Modulating the deceleration of the wheels also reduces fatigue on the struts and/or links of the landing gear of the aircraft.

Figure 10:
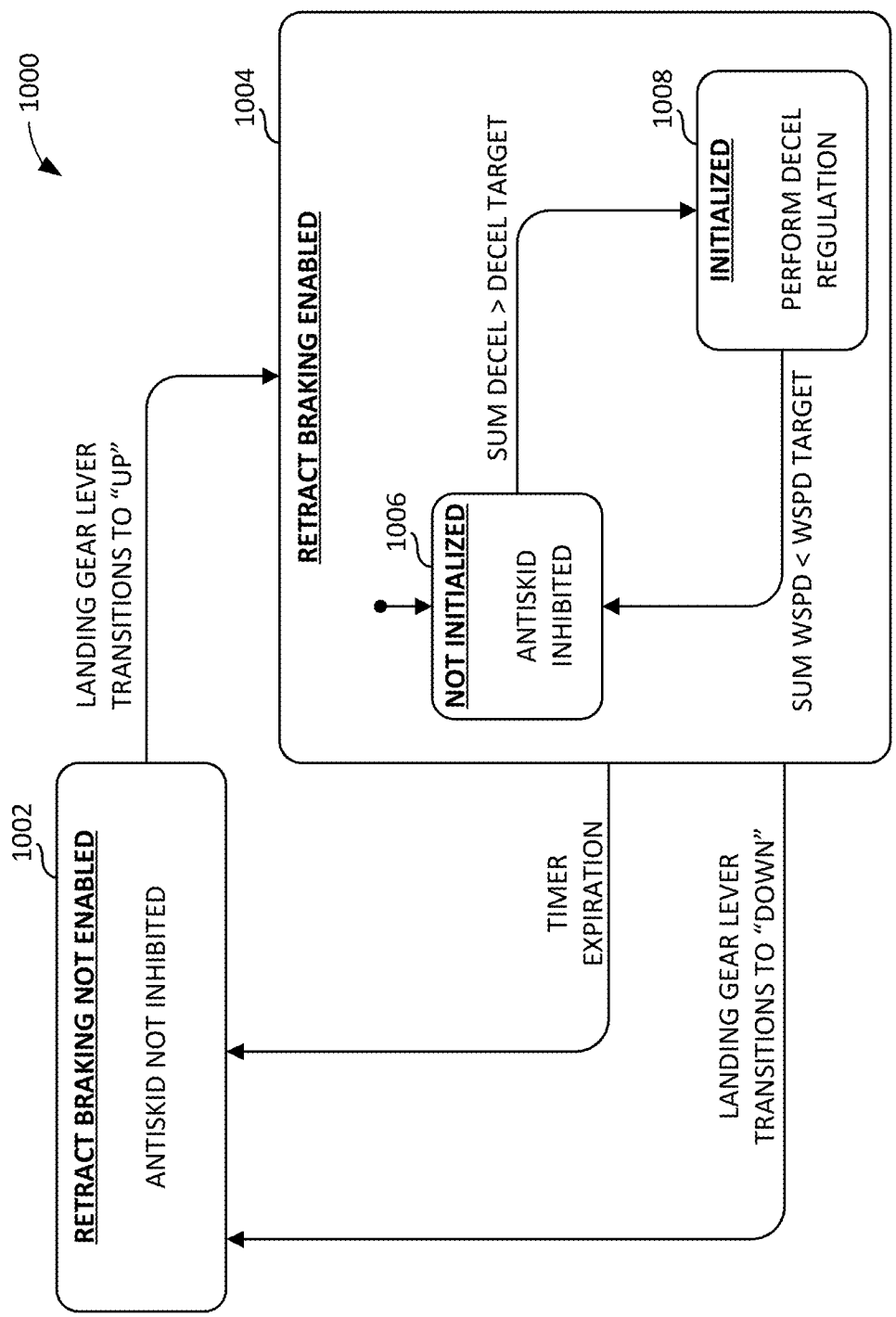
FIG. 10 is an example control loop to be implemented by the example controller of FIG. 8 to control landing gear retract braking.

FIG. 10 is an example control loop 1000 to be implemented by the example controller 812 of FIG. 8 to control landing gear retract braking. Implementation and/or execution of the control loop 1000 enables the regulation of wheel speed deceleration during a hydraulic retract braking process, while also ensuring that the wheel speed reaches a value of zero (e.g., that the wheel stops spinning) prior to the wheel entering a well of the aircraft in connection with a landing gear retraction process. The control loop 1000 of FIG. 10 includes a first example state 1002, a second example state 1004, a third example state 1006, and a fourth example state 1008. During the first state 1002 of FIG. 10, landing gear retract braking is not enabled, and antiskid functionality is not inhibited. The control loop 1000 of FIG. 10 transitions (e.g., advances) from the first state 1002 to the second state 1004 in response to the controller 812 of FIG. 8 determining that the landing gear lever of the aircraft has been moved and/or actuated (e.g., has transitioned) from the "DOWN" position into the "UP" position.

During the second state 1004 of FIG. 10, landing gear retract braking is enabled, and antiskid functionality is controlled based on the inner control loop and/or sub-states formed by the third state 1006 and the fourth state 1008 of FIG. 10. The control loop 1000 of FIG. 10 transitions (e.g., returns) from the second state 1004 to the first state 1002 in response to the controller 812 of FIG. 8 determining that the landing gear lever of the aircraft has been moved and/or actuated (e.g., has transitioned) from the "UP" position into the "DOWN" position. The control loop 1000 of FIG. 10 alternatively transitions (e.g., returns) from the second state 1004 to the first state 1002 in response to the controller 812 of FIG. 8 determining that a timer associated with the duration of execution of the second state 1004 has expired. In some examples, the timer may expire approximately twelve seconds after the second state 1004 of the control loop 1000 is initiated.

During the third state 1006 of FIG. 10, antiskid functionality is inhibited. The controller 812 of FIG. 8 implements a process during the third state 1006 of FIG. 10 to determine summed wheel speed data, and to determine rate of change data (e.g., wheel deceleration data) associated with the summed wheel speed data. An example process to be implemented by the controller 812 of FIG. 8 during the third state 1006 of the control loop 1000 of FIG. 10 is further discussed below in connection with FIG. 11. The control loop 1000 of FIG. 10 transitions (e.g., advances) from the third state 1006 to the fourth state 1008 in response to the controller 812 of FIG. 8 determining that the wheel deceleration data associated with the summed wheel speed data (referenced in FIG. 10 as "SUM DECEL") is greater than a wheel deceleration threshold (e.g., referenced in FIG. 10 as "DECEL TARGET").

During the fourth state 1008 of FIG. 10, the controller 812 of FIG. 8 implements a wheel deceleration regulation process. Example wheel deceleration regulation processes to be implemented by the controller 812 of FIG. 8 during the fourth state 1008 of the control loop 1000 of FIG. 10 are further discussed below in connection with FIGS. 12 and 13. The control loop 1000 of FIG. 10 transitions (e.g. returns) from the fourth state 1008 to the third state 1006 in response to the controller 812 of FIG. 8 determining that the summed wheel speed data (referenced in FIG. 10 as "SUM WSPD") is less than a wheel speed threshold (e.g., referenced in FIG. 10 as "WSPD TARGET").

Figure 11:
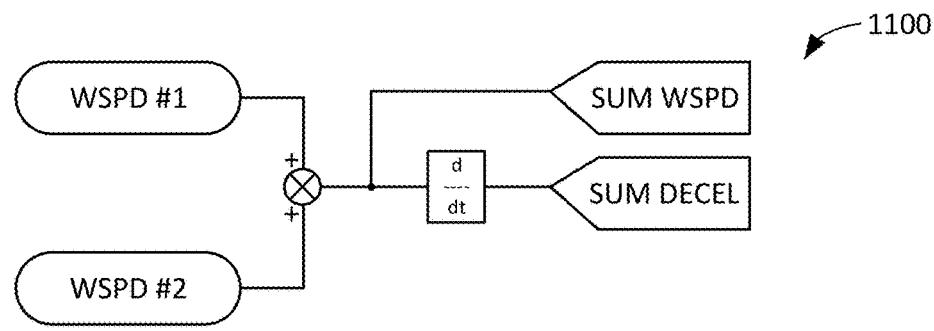
FIG. 11 illustrates an example process of the example control loop of FIG. 10 for determining summed wheel speed data, and for determining wheel deceleration data associated with the summed wheel speed data.

FIG. 11 illustrates an example process 1100 of the example control loop 1000 of FIG. 10 for determining summed wheel speed data, and for determining wheel deceleration data associated with the summed wheel speed data. The controller 812 of FIG. 8 executes and/or implements the process 1100 of FIG. 11 during the third state 1006 and/or, more generally, during the second state 1004 of the control loop 1000 of FIG. 10. In the process 1100 of FIG. 11, the controller 812 of FIG. 8 determines first wheel speed data (referenced in FIG. 11 as "WSPD-X") and second wheel speed data (referenced in FIG. 11 as "WSPD-Y").

For example, when the process 1100 of FIG. 11 is implemented and/or executed via the first control system 814 of FIG. 8, the first control system 814 determines the first wheel speed data based on the first LMLG wheel speed data sensed and/or detected by the first LMLG wheel speed sensor 802 of FIG. 8, and also determines the second wheel speed data based on the second LMLG wheel speed data sensed and/or detected by the second LMLG wheel speed sensor 804 of FIG. 8 (e.g., the second LMLG wheel speed data being obtained from the second control system 818).

As another example, when the process 1100 of FIG. 11 is implemented and/or executed via the second control system 818 of FIG. 8, the second control system 814 determines the first wheel speed data based on the second RMLG wheel speed data sensed and/or detected by the second RMLG wheel speed sensor 808 of FIG. 8, and also determines the first wheel speed data based on the first RMLG wheel speed data sensed and/or detected by the first RMLG wheel speed sensor 806 of FIG. 8 (e.g., the first RMLG wheel speed data being obtained from the first control system 814).

As further shown in the process 1100 of FIG. 11, the controller 812 of FIG. 8 determines summed wheel speed data (referenced in FIG. 11 as "SUM WSPD") by adding and/or summing together the first wheel speed data and the second wheel speed data. For example, when the process 1100 of FIG. 11 is implemented and/or executed via the first control system 814 of FIG. 8, the first control system 814 determines left summed wheel speed data by summing together the first LMLG wheel speed data and the second LMLG wheel speed data. As another example, when the process 1100 of FIG. 11 is implemented and/or executed via the second control system 818 of FIG. 8, the second control system 818 determines right summed wheel speed data by summing together the first RMLG wheel speed data and the second RMLG wheel speed data. The summed wheel speed data is an output of the process 1100 of FIG. 11.

As further shown in the process 1100 of FIG. 11, the controller 812 of FIG. 8 also determines rate of change data and/or wheel deceleration data (referenced in FIG. 11 as "SUM DECEL") associated with the summed wheel speed data. For example, when the process 1100 of FIG. 11 is implemented and/or executed via the first control system 814 of FIG. 8, the first control system 814 determines left wheel deceleration data associated with the left summed wheel speed data. As another example, when the process 1100 of FIG. 11 is implemented and/or executed via the second control system 818 of FIG. 8, the second control system 818 determines right wheel deceleration data associated with the right summed wheel speed data. The wheel deceleration data is an output of the process 1100 of FIG. 11.

Figure 12:
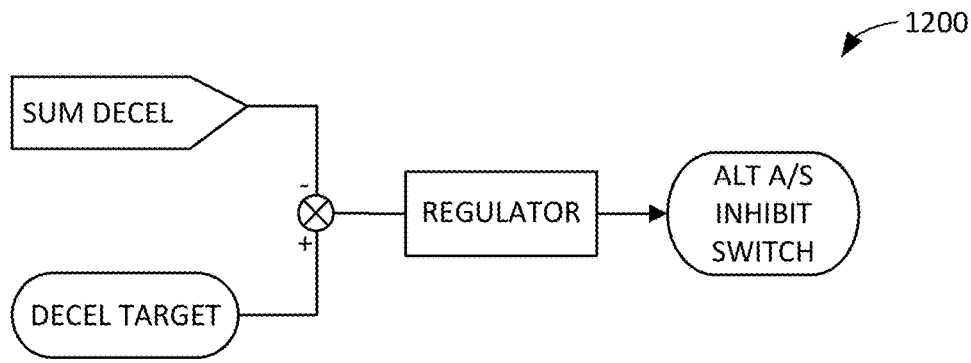
FIG. 12 illustrates an example wheel deceleration regulation process of the example control loop of FIG. 10.

FIG. 12 illustrates an example wheel deceleration regulation process 1200 of the example control loop 1000 of FIG. 10. The controller 812 of FIG. 8 executes and/or implements the wheel deceleration regulation process 1200 of FIG. 12 during the fourth state 1008 of the control loop 1000 of FIG. 10. The wheel deceleration data (reference in FIG. 12 as "SUM DECEL") determined via the process 1100 of FIG. 11 is an input to the wheel deceleration regulation process 1200 of FIG. 12. A wheel deceleration threshold (referenced in FIG. 12 and "DECEL TARGET") is also an input to the wheel deceleration regulation process 1200 of FIG. 12. In the illustrated example of FIG. 12, the controller 812 of FIG. 8 compares the wheel deceleration data to the wheel deceleration threshold. For example, when the wheel deceleration regulation process 1200 of FIG. 12 is implemented and/or executed via the first control system 814 of FIG. 8, the first control system 814 compares the left wheel deceleration data to the wheel deceleration threshold. As another example, when the wheel deceleration regulation process 1200 of FIG. 12 is implemented and/or executed via the second control system 818 of FIG. 8, the second control system 818 compares the right wheel deceleration data to the wheel deceleration threshold.

A regulator of and/or operatively coupled to the controller 812 of FIG. 8 and to an ALT A/S inhibit switch of FIG. 8 attempts to drive the difference between the wheel deceleration data and the wheel deceleration threshold to a value of zero (e.g., by modulating a duty cycle of the ALT A/S inhibit switch). For example, when the wheel deceleration regulation process 1200 of FIG. 12 is implemented and/or executed via the first control system 814 of FIG. 8, a regulator operatively coupled to the first control system 814 and to the first ALT A/S inhibit switch 822 of FIG. 8 attempts to drive the difference between the left wheel deceleration data and the wheel deceleration threshold to a value of zero. As another example, when the wheel deceleration regulation process 1200 of FIG. 12 is implemented and/or executed via the second control system 818 of FIG. 8, a regulator operatively coupled to the second control system 818 and to the second ALT A/S inhibit switch 824 of FIG. 8 attempts to drive the difference between the right wheel deceleration data and the wheel deceleration threshold to a value of zero.

The wheel deceleration regulation process 1200 of FIG. 12 accordingly modulates brake pressures via the regulator(s) and respective ones of the first ALT A/S inhibit switch 822 and the second ALT A/S inhibit switch 824 between the full landing gear retract brake pressure and the return pressure. In some examples, the modulation rate implemented by the controller 812 is faster than the response time of the hydraulic retract braking system, thereby resulting in a smooth, regulated brake pressure at respective ones of the left brakes 316 and the right brakes 318, as provided and/or managed via corresponding respective ones of the left ALT A/S valve 312 and the right ALT A/S valve 314.

Figure 13:
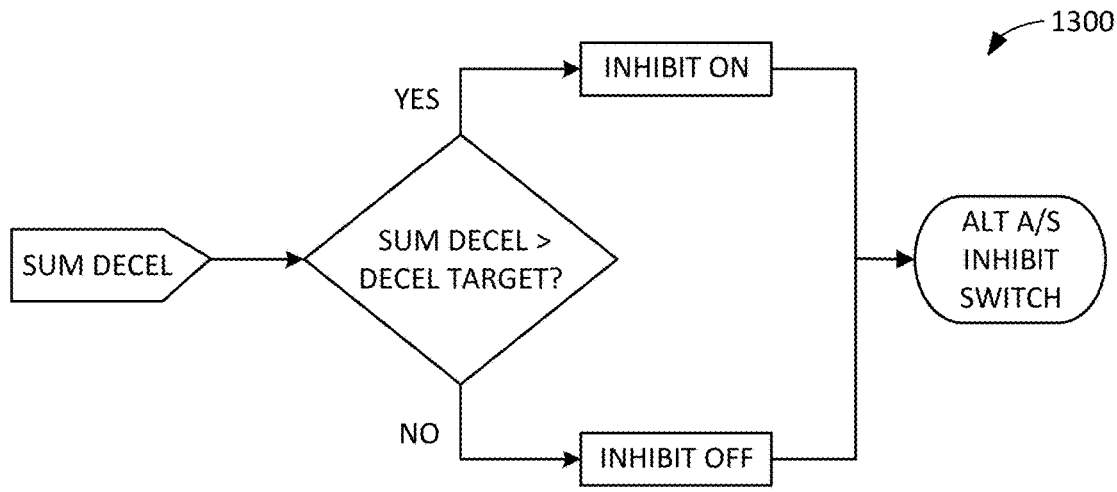
FIG. 13 illustrates an alternate example wheel deceleration regulation process of the example control loop of FIG. 10.

FIG. 13 illustrates an alternate example wheel deceleration regulation process 1300 of the example control loop 1000 of FIG. 10. The controller 812 of FIG. 8 executes and/or implements the wheel deceleration regulation process 1300 of FIG. 13 during the fourth state 1008 of the control loop 1000 of FIG. 10. The wheel deceleration data determined via the process 1100 of FIG. 11 is an input to the wheel deceleration regulation process 1300 of FIG. 13. In the wheel deceleration regulation process 1300 of FIG. 13, the controller 812 of FIG. 8 determines whether the wheel deceleration data (referenced in FIG. 13 as "SUM DECEL") is greater than a wheel deceleration threshold (reference in FIG. 13 as "DECEL TARGET"). If the controller 812 determines that the wheel deceleration data is greater than the wheel deceleration threshold, the controller 812 generates a first control signal (e.g., a first inhibit command) corresponding to an inhibit "ON" command. If the controller 812 instead determines that the wheel deceleration data is not greater than the wheel deceleration threshold, the controller 812 generates a second control signal (e.g., a second inhibit command) corresponding to an inhibit "OFF" command.

For example, when the wheel deceleration regulation process 1300 of FIG. 13 is implemented and/or executed via the first control system 814 of FIG. 8, the first control system 814 determines whether the left wheel deceleration data is greater than the wheel deceleration threshold. If the first control system 814 determines that the left wheel deceleration data is greater than the wheel deceleration threshold, the first control system 814 generates a first control signal (e.g., a first inhibit command) corresponding to an inhibit "ON" command. If the first control system 814 instead determines that the left wheel deceleration data is not greater than the wheel deceleration threshold, the first control system 814 generates a second control signal (e.g., a second inhibit command) corresponding to an inhibit "OFF" command. Respective ones of the first control signal and the second control signal are transmitted and/or conveyed to the first ALT A/S inhibit switch 822 of FIG. 8. In response to the first control signal, the first ALT A/S inhibit switch 822 is turned on, which causes full antiskid current via the left ALT A/S valve 312 to release brake pressure from the left brakes 316. In response to the second control signal, the first ALT A/S inhibit switch 822 is turned off, which causes the left ALT A/S valve 312 to cease releasing brake pressure from the left brakes 316.

As another example, when the wheel deceleration regulation process 1300 of FIG. 13 is implemented and/or executed via the second control system 818 of FIG. 8, the second control system 818 determines whether the right wheel deceleration data is greater than the wheel deceleration threshold. If the second control system 818 determines that the right wheel deceleration data is greater than the wheel deceleration threshold, the second control system 818 generates a first control signal (e.g., a first inhibit command) corresponding to an inhibit "ON" command. If the second control system 818 instead determines that the right wheel deceleration data is not greater than the wheel deceleration threshold, the second control system 818 generates a second control signal (e.g., a second inhibit command) corresponding to an inhibit "OFF" command. Respective ones of the first control signal and the second control signal are transmitted and/or conveyed to the second ALT A/S inhibit switch 824 of FIG. 8. In response to the first control signal, the second ALT A/S inhibit switch 824 is turned on, which causes full antiskid current via the right ALT A/S valve 314 to release brake pressure from the right brakes 318. In response to the second control signal, the second ALT A/S inhibit switch 824 is turned off, which causes the right ALT A/S valve 314 to cease releasing brake pressure from the right brakes 318.

While example manners of implementing the retract braking control system 800 are illustrated in FIGS. 8-13, one or more of the elements, processes and/or devices illustrated in FIGS. 8-13 may be combined, divided, re-arranged, omitted, eliminated and/or implemented in any other way. Further, the first example LMLG wheel speed sensor 802, the second example LMLG wheel speed sensor 804, the first example RMLG wheel speed sensor 806, the second example RMLG wheel speed sensor 808, the example landing gear lever position sensor 810, the example controller 812, the first example control system 814, the first example memory 816, the second example control system 818, the second example memory 820, the first example ALT A/S inhibit switch 822, the second example ALT A/S inhibit switch 824, and/or, more generally, the example retract braking control system 800 of FIGS. 8-13 may be implemented by hardware, software, firmware and/or any combination of hardware, software and/or firmware. Thus, for example, any of the first example LMLG wheel speed sensor 802, the second example LMLG wheel speed sensor 804, the first example RMLG wheel speed sensor 806, the second example RMLG wheel speed sensor 808, the example landing gear lever position sensor 810, the example controller 812, the first example control system 814, the first example memory 816, the second example control system 818, the second example memory 820, the first example ALT A/S inhibit switch 822, the second example ALT A/S inhibit switch 824, and/or, more generally, the example retract braking control system 800 of FIGS. 8-13 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the first example LMLG wheel speed sensor 802, the second example LMLG wheel speed sensor 804, the first example RMLG wheel speed sensor 806, the second example RMLG wheel speed sensor 808, the example landing gear lever position sensor 810, the example controller 812, the first example control system 814, the first example memory 816, the second example control system 818, the second example memory 820, the first example ALT A/S inhibit switch 822, the second example ALT A/S inhibit switch 824, and/or, more generally, the example retract braking control system 800 of FIGS. 8-13 is/are hereby expressly defined to include a non-transitory computer readable storage device or storage disk such as a memory, a digital versatile disk (DVD), a compact disk (CD), a Blu-ray disk, etc. including the software and/or firmware. Further still, the example retract braking control system 800 of FIGS. 8-13 may include one or more elements, processes and/or devices in addition to, or instead of, those illustrated in FIGS. 8-13, and/or may include more than one of any or all of the illustrated elements, processes and devices.

Figure 14:
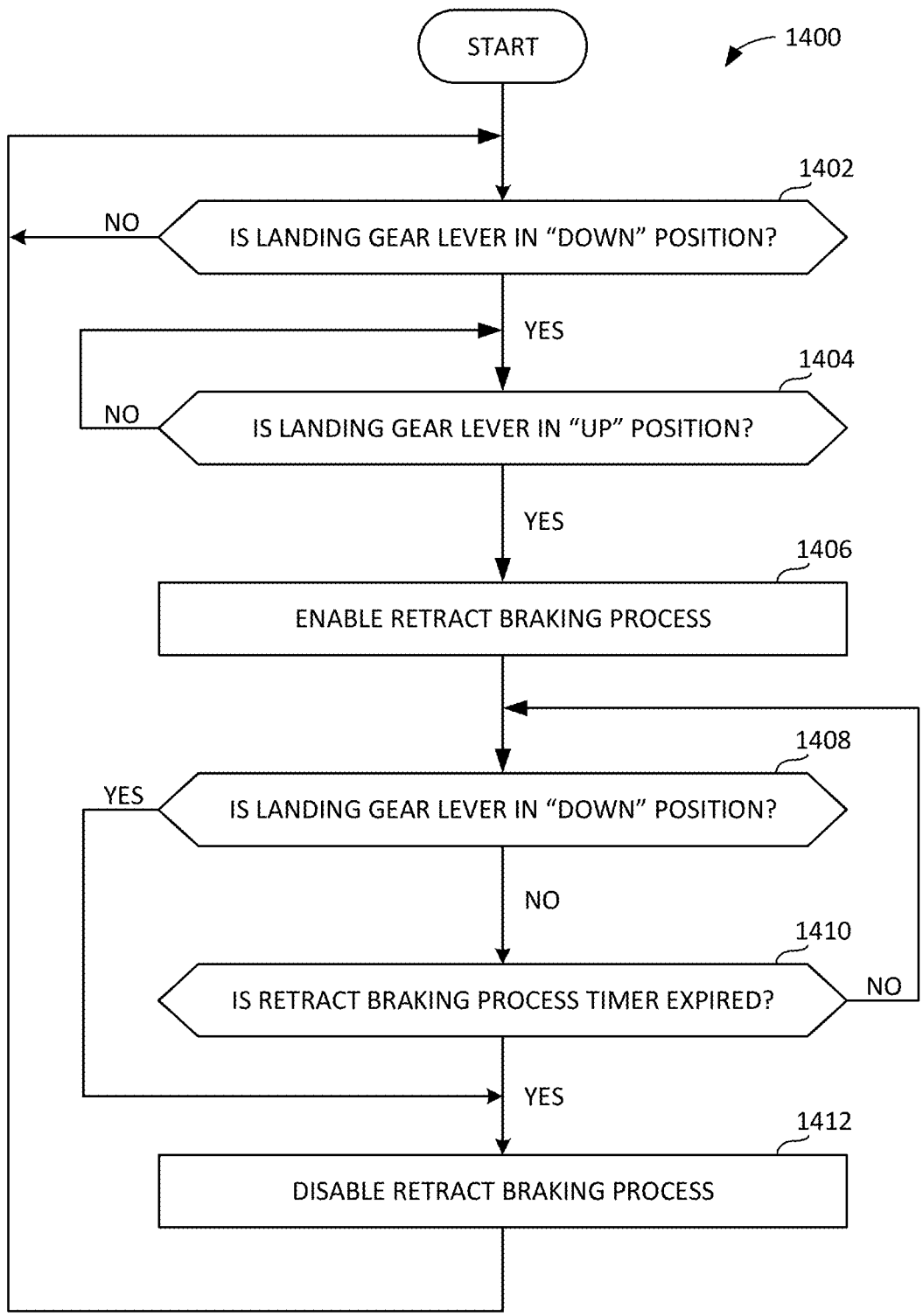
FIG. 14 is a flowchart representative of an example method that may be executed at the example controller of the example retract braking control system of FIGS. 8-13 to control landing gear retract braking.
Figure 15:
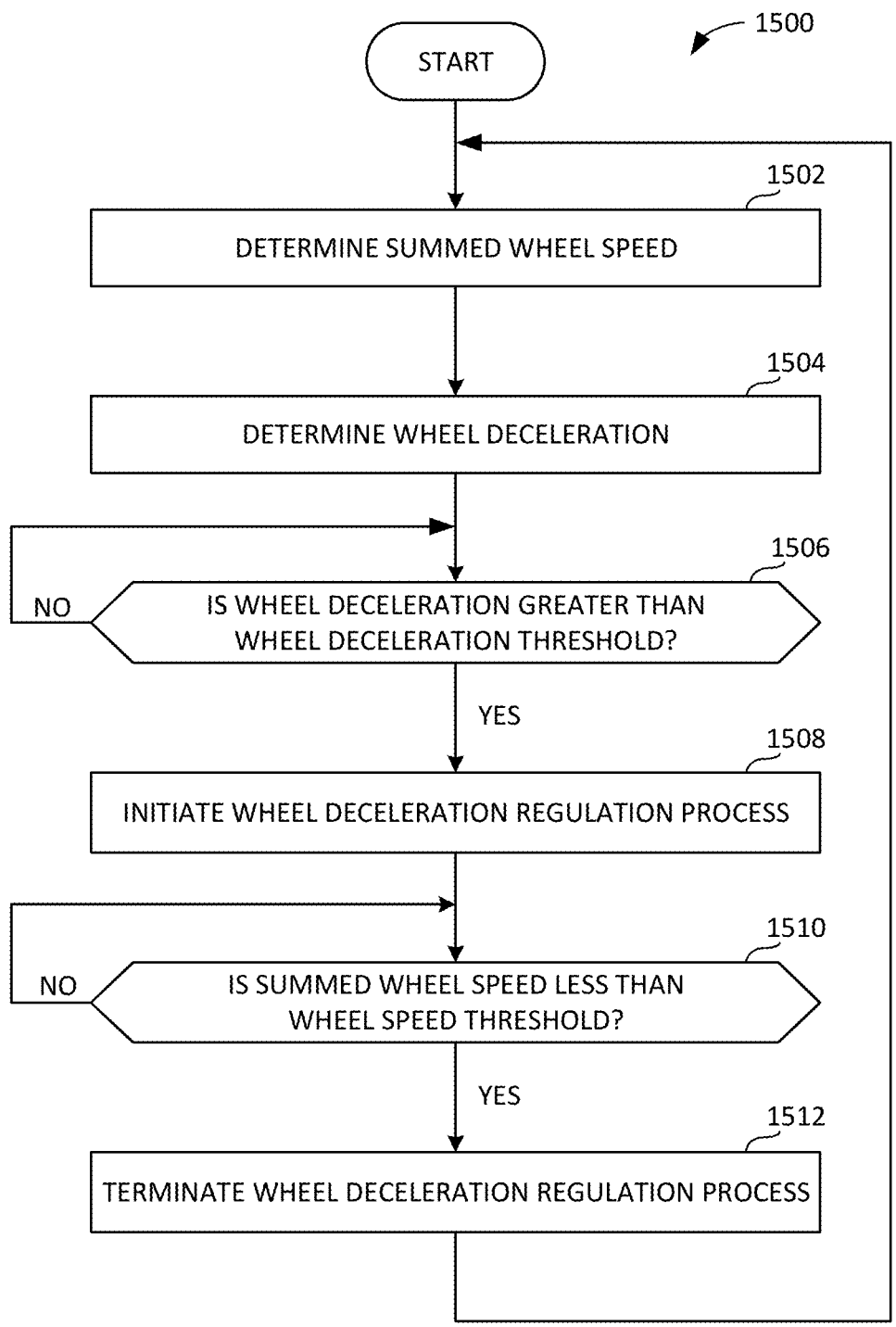
FIG. 15 is a flowchart representative of an example method that may be executed at the example controller of the example retract braking control system of FIGS. 8-13 to control wheel deceleration during landing gear retract braking.

Flowchart representative of an example methods for implementing the example retract braking control system 800 of FIGS. 8-13 to control landing gear retract braking and to control wheel deceleration are shown in FIGS. 14 and 15. In these examples, the methods may be implemented using machine-readable instructions that comprise one or more program(s) for execution by one or more processor(s) such as the processor 1602 shown in the example processor platform 1600 discussed below in connection with FIG. 16. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 1602, but the entirety of any program and/or parts thereof could alternatively be executed by a device other than the processor 1602, and/or embodied in firmware or dedicated hardware. Further, although the example program(s) is/are described with reference to the flowcharts illustrated in FIGS. 14 and 15, many other methods of implementing the example retract braking control system 800 of FIGS. 8-13 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example methods of FIGS. 14 and 15 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 14 is a flowchart representative of an example method 1400 that may be executed at the example controller 812 of the example retract braking control system 800 of FIGS. 8-13 to control landing gear retract braking. The example method 1400 of FIG. 14 begins when the controller 812 of FIG. 8 determines whether a landing gear lever is in an "DOWN" position (block 1402). If the controller 812 determines at block 1402 that the landing gear lever is in the "DOWN" position, control of the example method 1400 proceeds to block 1404. If the controller 812 instead determines at block 1402 that the landing gear lever is not in the "DOWN" position, control of the example method 1400 remains at block 1402.

At block 1404, the controller 812 of FIG. 8 determines whether the landing gear lever is in an "UP" position (block 1404). If the controller 812 determines at block 1404 that the landing gear lever is in the "UP" position, control of the example method 1400 proceeds to block 1406. If the controller 812 instead determines at block 1404 that the landing gear lever is not in the "UP" position, control of the example method 1400 remains at block 1404. Accordingly, the progression from block 1402 through block 1406 of the example method 1400 of FIG. 14 occurs in response to the landing gear lever transitioning from as established "DOWN" position to an established "UP" position.

At block 1406, the controller 812 of FIG. 8 enables a retract braking process (block 1406). In some examples, the controller 812 of FIG. 8 may implement and/or execute the example method 1500 of FIG. 15 described below in response to the retract braking process being enabled at block 1406. Following enablement of the retract braking process at block 1406, control of the example method 1400 proceeds to block 1408.

At block 1408, the controller 812 of FIG. 8 determines whether the landing gear lever is in the "DOWN" position (block 1408). If the controller 812 determines at block 1408 that the landing gear lever is not in the "DOWN" position, control of the example method 1400 proceeds to block 1410. If the controller 812 instead determines at block 1408 that the landing gear lever is in the "DOWN" position, control of the example method 1400 proceeds to block 1412.

At block 1410, the controller 812 of FIG. 8 determines whether a timer associated with enabling the retract braking process has expired (block 1410). If the controller 812 determines at block 1410 that the timer has not expired, control of the example method 1400 returns to block 1408. If the controller 812 instead determines at block 1410 that the timer has expired, control of the example method 1400 proceeds to block 1412.

At block 1412, the controller 812 of FIG. 8 disables the retract braking process (block 1412). Following block 1412, control of the example method 1400 returns to block 1402. In some examples, blocks 1402, 1404, 1406, 1408, 1410 and 1412 correspond to one or more portion(s) of the control loop 1000 of FIG. 10 described above.

FIG. 15 is a flowchart representative of an example method 1500 that may be executed at the example controller 812 of the example retract braking control system 800 of FIGS. 8-13 to control wheel deceleration during landing gear retract braking. The example method 1500 of FIG. 15 begins in response to the enablement of the retract braking process at block 1406 of the example method 1400 of FIG. 14. The example method 1500 of FIG. 15 ends in response to the disablement of the retract barking process at block 1414 of the example method 1400 of FIG. 14.

While the example method 1500 of FIG. 15 is being implemented and/or executed (e.g., while the retract braking process is enabled), the controller 812 of FIG. 8 determines summed wheel speed data (block 1502) and further determines rate of change data (e.g., wheel deceleration data) associated with the summed wheel speed data (block 1504). In some examples, the controller 812 may determine the summed wheel speed data (block 1502) and the wheel deceleration data (block 1504) by implementing the process 1100 of FIG. 11 described above. In some examples, the controller 812 of FIG. 8 continuously or periodically determines the summed wheel speed data (block 1502) and the wheel deceleration data (block 1504) while the retract braking process is enabled, and/or throughout the example method 1500 of FIG. 15.

At block 1506, the controller 812 of FIG. 8 determines whether the wheel deceleration data is greater than a wheel deceleration threshold (block 1506). If the controller 812 determines at block 1506 that the wheel deceleration data is greater than the wheel deceleration threshold, control of the example method 1500 proceeds to block 1508. If the controller 812 instead determines at block 1506 that the wheel deceleration data is not greater than the wheel deceleration threshold, control of the example method 1500 remains at block 1506. Although not specifically shown in FIG. 15, it is to be understood that blocks 1502 and 1504 of the example method 1500 may be continuously and/or periodically repeated while control of the example method 1500 remains at block 1506 such that the determination being made at block 1506 is based on continuously and/or periodically updated wheel deceleration data.

At block 1508, the controller 812 of FIG. 8 initiates a wheel deceleration regulation process (block 1508). For example, the controller 812 may initiate the wheel deceleration regulation process 1200 of FIG. 12 described above, or may alternatively initiate the wheel deceleration regulation process 1300 of FIG. 13 described above.

At block 1510, the controller 812 of FIG. 8 determines whether the summed wheel speed data is less than a wheel speed threshold (block 1510). If the controller 812 determines at block 1510 that the summed wheel speed data is less than the wheel speed threshold, control of the example method 1500 proceeds to block 1512. If the controller 812 instead determines at block 1510 that the summed wheel speed data is not less than the wheel speed threshold, control of the example method 1500 remains at block 1510. Although not specifically shown in FIG. 15, it is to be understood that blocks 1502 and 1504 of the example method 1500 may be continuously and/or periodically repeated while control of the example method 1500 remains at block 1510 such that the determination being made at block 1510 is based on continuously and/or periodically updated summed wheel speed data.

At block 1512, the controller 812 of FIG. 8 terminates the wheel deceleration regulation process (block 1512). For example, the controller 812 may terminate the wheel deceleration regulation process 1200 of FIG. 12 described above, or may alternatively terminate the wheel deceleration regulation process 1300 of FIG. 13 described above. Following block 1512, control of the example method 1500 returns to block 1502. In some examples, blocks 1502, 1504, 1506, 1508, 1510 and 1512 correspond to one or more portion(s) of the control loop 1000 of FIG. 10 and/or the control loop sub-processes of FIGS. 11-13 described above.

Figure 16:
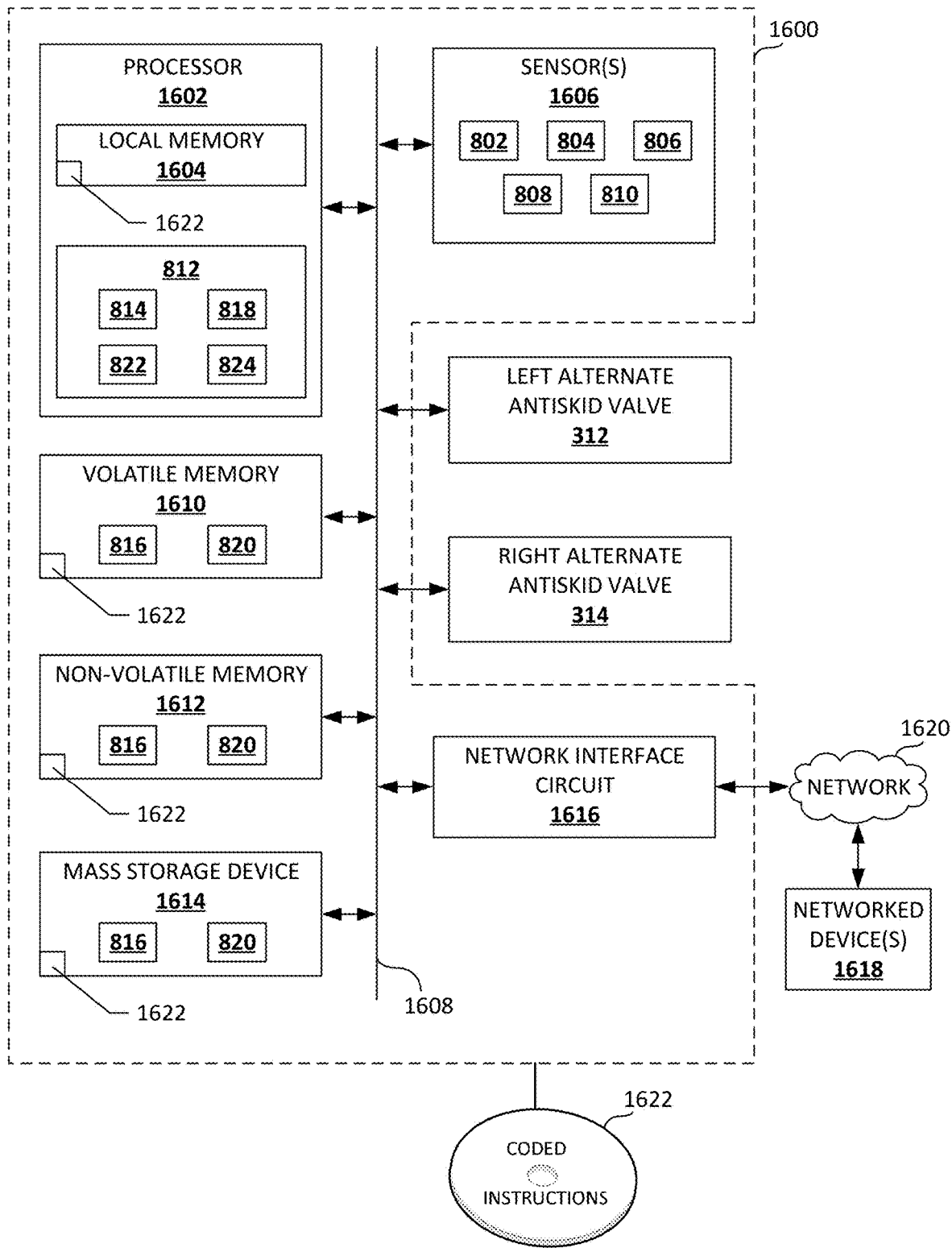
FIG. 16 is a block diagram of an example processor platform capable of executing instructions to implement the example methods of FIGS. 14 and 15, and the example retract braking control systems of FIGS. 8-13.

FIG. 16 is a block diagram of an example processor platform 1600 capable of executing instructions to implement the example methods 1400, 1500 of FIGS. 14 and 15, and the example retract braking control system 800 of FIGS. 8-13. The processor platform 1600 of the illustrated example includes a processor 1602. The processor 1602 of the illustrated example is hardware. For example, the processor 1602 can be implemented by one or more integrated circuit(s), logic circuit(s), microprocessor(s) or controller(s) from any desired family or manufacturer. In the example of FIG. 16, the processor 1602 implements the example controller 812, the first example control system 814, the second example control system 818, the first example ALT A/S inhibit switch 822, and the second example ALT A/S inhibit switch 824 of FIG. 8. The processor 1602 of the illustrated example also includes a local memory 1604 (e.g., a cache).

The processor 1602 of the illustrated example is in communication with one or more sensor(s) 1606 via a bus 1608 (e.g., a CAN bus). In the example of FIG. 16, the sensor(s) 1606 include the first example the first example LMLG wheel speed sensor 802, the second example LMLG wheel speed sensor 804, the first example RMLG wheel speed sensor 806, the second example RMLG wheel speed sensor 808, and the example landing gear lever position sensor 810 of FIG. 8. The processor 1602 of the illustrated example may transmit one or more control signal(s) and/or command(s) to the example left ALT A/S valve 312 and/or the example right ALT A/S valve 314 of FIGS. 8 and 9.

The processor 1602 of the illustrated example is also in communication with a main memory including a volatile memory 1610 and a non-volatile memory 1612 via the bus 1608. The volatile memory 1610 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1612 may be implemented by flash memory and/or any other desired type of memory device. Access to the volatile memory 1610 and the non-volatile memory 1612 is controlled by a memory controller. In the illustrated example, the main memory 1610, 1612 includes the first example memory 816 and the second example memory 820 of FIG. 8.

The processor 1602 of the illustrated example is also in communication with a mass storage device 1614 for storing software and/or data. The mass storage device 1614 may be implemented, for example, via one or more floppy disk drives, hard drive disks, compact disk drives, Blu-ray disk drives, RAID systems, digital versatile disk (DVD) drives, etc. In the illustrated example, the mass storage device 1614 includes the first example memory 816 and the second example memory 820 of FIG. 8.

The processor platform 1600 of the illustrated example also includes a network interface circuit 1616. The network interface circuit 1616 may be implemented by any type of interface standard, such as an Ethernet interface, a universal serial bus (USB), and/or a PCI express interface. The network interface circuit 1616 of the illustrated example includes a communication device such as a transmitter, a receiver, a transceiver, a modem and/or network interface card to facilitate exchange of data with one or more networked device(s) 1618 (e.g., computing and/or controller devices of any kind) via a network 1620 (e.g., a controller area network, a wireless network, a cellular network, etc.).

Coded instructions 1622 for implementing the example methods 1400, 1500 of FIGS. 14 and 15 may be stored in the local memory 1604, in the volatile memory 1610, in the non-volatile memory 1612, on the mass storage device 1614, and/or on a removable tangible computer readable storage medium such as a CD or DVD.

From the foregoing, it will be appreciated that the disclosed methods and apparatus advantageously provide modulated wheel deceleration control in connection with the retract braking of one or more wheel(s) of an aircraft. In some disclosed examples, an active, modulated wheel deceleration process is implemented based on wheel speed data obtained from one or more respective wheel speed sensor(s) that are operatively coupled to corresponding respective ones of the one or more wheel(s) of the aircraft. In response to the wheel speed data indicating an excessive rate of wheel deceleration, antiskid valves may be actuated to release brake pressure being applied to the wheels in connection with the retract braking process. Modulating wheel deceleration in connection with the retract braking process and/or during a landing gear retraction process advantageously reduces the extent of the applied deceleration moment and the resulting rebound that may otherwise be more significant when the wheels are rapidly decelerated and/or when the deceleration of the wheels is not actively regulated. The disclosed retract braking control systems accordingly reduce the likelihood of the wheels of the aircraft colliding with wing-to-body fairings surrounding wells of the aircraft in connection with the landing gear retraction process. The disclosed retract braking control systems also reduce fatigue on the struts and/or links of the landing gear of the aircraft.

In some examples, an apparatus is disclosed. In some disclosed examples, the apparatus comprises a controller. In some disclosed examples, the controller is to determine wheel speed data corresponding to a speed of a wheel of a landing gear. In some disclosed examples, the controller is to determine wheel deceleration data corresponding to a rate of change of the wheel speed data. In some disclosed examples, the controller is to generate a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the controller is to generate a second control signal in response to the wheel speed data being less than a wheel speed threshold. In some disclosed examples, the second control signal is to terminate the wheel deceleration regulation process.

In some disclosed examples, the wheel speed data is summed wheel speed data corresponding to a sum of a speed of a first wheel of the landing gear and a speed of a second wheel of the landing gear. In some disclosed examples, the controller is to obtain the wheel speed data from a wheel speed sensor operatively coupled to the wheel of the landing gear.

In some disclosed examples, the controller includes an antiskid inhibit switch to control cycling of the antiskid valve between the first valve position and the second valve position. In some disclosed examples, the antiskid inhibit switch is to operate between a first switch position corresponding to the first valve position and a second switch position corresponding to the second valve position. In some disclosed examples, the antiskid inhibit switch is to operate between the first switch position and the second switch position based on a duty cycle.

In some disclosed examples, the controller is to enable a retract braking process in response to a landing gear lever being moved from a first lever position to a second lever position. In some disclosed examples, the retract braking process includes the wheel deceleration regulation process. In some disclosed examples, the controller is to disable the retract braking process in response to the landing gear lever being moved from the second lever position to the first lever position, or in response to expiration of a timer associated with a duration of the retract braking process.

In some examples, a method is disclosed. In some disclosed examples, the method comprises determining, by executing one or more instructions via a controller, wheel speed data corresponding to a speed of a wheel of a landing gear. In some disclosed examples, the method comprises determining, by executing one or more instructions via the controller, wheel deceleration data corresponding to a rate of change of the wheel speed data. In some disclosed examples, the method comprises generating, by executing one or more instructions via the controller, a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the method comprises generating, by executing one or more instructions via the controller, a second control signal in response to the wheel speed data being less than a wheel speed threshold. In some disclosed examples, the second control signal is to terminate the wheel deceleration regulation process.

In some disclosed examples of the method, the wheel speed data is summed wheel speed data corresponding to a sum of a speed of a first wheel of the landing gear and a speed of a second wheel of the landing gear. In some disclosed examples, the method further comprises obtaining the wheel speed data from a wheel speed sensor operatively coupled to the wheel of the landing gear.

In some disclosed examples of the method, the cycling of the antiskid valve between the first valve position and the second valve position is controlled via an antiskid inhibit switch. In some disclosed examples, the antiskid inhibit switch is to operate between a first switch position corresponding to the first valve position and a second switch position corresponding to the second valve position. In some disclosed examples, the antiskid inhibit switch is to operate between the first switch position and the second switch position based on a duty cycle.

In some disclosed examples, the method further comprises enabling a retract braking process in response to determining that a landing gear lever has moved from a first lever position to a second lever position. In some disclosed examples, the retract braking process includes the wheel deceleration regulation process. In some disclosed examples, the method further comprises disabling the retract braking process in response to determining that the landing gear lever has moved from the second lever position to the first lever position, or in response to determining that a timer associated with a duration of the retract braking process has expired.

In some examples, a non-transitory machine-readable storage medium comprising instructions is disclosed. In some disclosed examples, the instructions, when executed, cause a controller to determine wheel speed data corresponding to a speed of a wheel of a landing gear. In some disclosed examples, the instructions, when executed, cause the controller to determine wheel deceleration data corresponding to a rate of change of the wheel speed data. In some disclosed examples, the instructions, when executed, cause the controller to generate a first control signal in response to the wheel deceleration data being greater than a wheel deceleration threshold. In some disclosed examples, the first control signal is to initiate a wheel deceleration regulation process, the wheel deceleration regulation process to cycle an antiskid valve between a first valve position to release brake pressure from the wheel and a second valve position to cease releasing the brake pressure from the wheel. In some disclosed examples, the instructions, when executed, cause the controller to generate a second control signal in response to the wheel speed data being less than a wheel speed threshold. In some disclosed examples, the second control signal is to terminate the wheel deceleration regulation process.

In some disclosed examples, the wheel speed data is summed wheel speed data corresponding to a sum of a speed of a first wheel of the landing gear and a speed of a second wheel of the landing gear. In some disclosed examples, the instructions, when executed, cause the controller to control the cycling of the antiskid valve via an antiskid inhibit switch. In some disclosed examples, the antiskid inhibit switch is to operate between a first switch position corresponding to the first valve position and a second switch position corresponding to the second valve position. In some disclosed examples, the antiskid inhibit switch is to operate between the first switch position and the second switch position based on a duty cycle.

In some disclosed examples, the instructions, when executed, cause a controller to enable a retract braking process in response to determining that a landing gear lever has moved from a first lever position to a second lever position. In some disclosed examples, the retract braking process includes the wheel deceleration regulation process. In some disclosed examples, the instructions, when executed, cause a controller to disable the retract braking process in response to determining that the landing gear lever has moved from the second lever position to the first lever position, or in response to determining that a timer associated with a duration of the retract braking process has expired.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controller configured to:
    initiate a retract braking process in response to determining that a landing gear lever has moved from a first lever position to a second lever position, the retract braking process to decelerate a wheel of a shrinkable landing gear as the shrinkable landing gear moves from a deployed position to a retracted position, the deceleration of the wheel to generate an applied moment transferable to a lower strut of the shrinkable landing gear;
    determine wheel speed data corresponding to a speed of the wheel;
    determine wheel deceleration data corresponding to a rate of change of the wheel speed data;
    generate a first control signal in response to the wheel deceleration data being greater than a wheel deceleration threshold, the first control signal to modulate the deceleration of the wheel during the retract braking process by cycling an antiskid valve between a first valve position to release brake pressure from the wheel and a second valve position to cease releasing the brake pressure from the wheel, the cycling of the antiskid valve to reduce an extent of the applied moment; and
    generate a second control signal in response to the wheel speed data becoming less than a wheel speed threshold during the modulation of the deceleration of the wheel, the second control signal to terminate the modulation of the deceleration of the wheel.

2. The apparatus of claim 1, wherein the wheel speed data is summed wheel speed data corresponding to a sum of a speed of a first wheel of the shrinkable landing gear and a speed of a second wheel of the shrinkable landing gear.

3. The apparatus of claim 1, wherein the controller is configured to obtain the wheel speed data from a wheel speed sensor operatively coupled to the wheel of the shrinkable landing gear.

4. The apparatus of claim 1, wherein the controller includes an anti skid inhibit switch configured to control the cycling of the antiskid valve between the first valve position and the second valve position.

5. The apparatus of claim 4, wherein the antiskid inhibit switch is configured to operate between a first switch position corresponding to the first valve position and a second switch position corresponding to the second valve position.

6. The apparatus of claim 5, wherein the antiskid inhibit switch is configured to operate between the first switch position and the second switch position based on a duty cycle.

7. The apparatus of claim 1, wherein the controller is configured to terminate the retract braking process in response to determining that the landing gear lever has moved from the second lever position to the first lever position, or in response to determining that a timer associated with a duration of the retract braking process has expired.

8. A method comprising:
    initiating, by executing one or more instructions via a controller, a retract braking process in response to determining that a landing gear lever has moved from a first lever position to a second lever position, the retract braking process decelerating a wheel of a shrinkable landing gear as the shrinkable landing gear moves from a deployed position to a retracted position, the deceleration of the wheel generating an applied moment transferable to a lower strut of the shrinkable landing gear;
    determining, by executing one or more instructions via the controller, wheel speed data corresponding to a speed of the wheel;
    determining, by executing one or more instructions via the controller, wheel deceleration data corresponding to a rate of change of the wheel speed data;
    generating, by executing one or more instructions via the controller, a first control signal in response to the wheel deceleration data being greater than a wheel deceleration threshold, the first control signal modulating the deceleration of the wheel during the retract braking process by cycling an antiskid valve between a first valve position that releases brake pressure from the wheel and a second valve position that ceases releasing the brake pressure from the wheel, the cycling of the antiskid valve reducing an extent of the applied moment; and
    generating, by executing one or more instructions via the controller, a second control signal in response to the wheel speed data becoming less than a wheel speed threshold during the modulation of the deceleration of the wheel, the second control signal terminating the modulation of the deceleration of the wheel.

9. The method of claim 8, wherein the wheel speed data is summed wheel speed data corresponding to a sum of a speed of a first wheel of the shrinkable landing gear and a speed of a second wheel of the shrinkable landing gear.

10. The method of claim 8, further comprising obtaining the wheel speed data from a wheel speed sensor operatively coupled to the wheel of the shrinkable landing gear.

11. The method of claim 8, wherein the cycling of the antiskid valve between the first valve position and the second valve position is controlled via an antiskid inhibit switch.

12. The method of claim 11, wherein the antiskid inhibit switch operates between a first switch position corresponding to the first valve position and a second switch position corresponding to the second valve position.

13. The method of claim 12, wherein the antiskid inhibit switch operates between the first switch position and the second switch position based on a duty cycle.

14. The method of claim 8, further comprising terminating the retract braking process in response to determining that the landing gear lever has moved from the second lever position to the first lever position, or in response to determining that a timer associated with a duration of the retract braking process has expired.

15. A non-transitory machine-readable storage medium comprising instructions that, when executed, cause a controller to at least:
  initiate a retract braking process in response to determining that a landing gear lever has moved from a first lever position to a second lever position, the retract braking process to decelerate a wheel of a shrinkable landing gear as the shrinkable landing gear moves from a deployed position to a retracted position, the deceleration of the wheel to generate an applied moment transferable to a lower strut of the shrinkable landing gear;
  determine wheel speed data corresponding to a speed of the wheel;
  determine wheel deceleration data corresponding to a rate of change of the wheel speed data;
  generate a first control signal in response to the wheel deceleration data being greater than a wheel deceleration threshold, the first control signal to modulate the deceleration of the wheel during the retract braking process by cycling an antiskid valve between a first valve position to release brake pressure from the wheel and a second valve position to cease releasing the brake pressure from the wheel, the cycling of the antiskid valve to reduce an extent of the applied moment; and
  generate a second control signal in response to the wheel speed data becoming less than a wheel speed threshold during the modulation of the deceleration of the wheel, the second control signal to terminate the modulation of the deceleration of the wheel.

16. The non-transitory machine-readable storage medium of claim 15, wherein the wheel speed data is summed wheel speed data corresponding to a sum of a speed of a first wheel of the shrinkable landing gear and a speed of a second wheel of the shrinkable landing gear.

17. The non-transitory machine-readable storage medium of claim 15, wherein the instructions, when executed, cause the controller to control the cycling of the anti skid valve via an anti skid inhibit switch.

18. The non-transitory machine-readable storage medium of claim 17, wherein the antiskid inhibit switch is configured to operate between a first switch position corresponding to the first valve position and a second switch position corresponding to the second valve position.

19. The non-transitory machine-readable storage medium of claim 18, wherein the antiskid inhibit switch is configured to operate between the first switch position and the second switch position based on a duty cycle.

20. The non-transitory machine-readable storage medium of claim 15, wherein the instructions, when executed, cause the controller to terminate the retract braking process in response to determining that the landing gear lever has moved from the second lever position to the first lever position, or in response to determining that a timer associated with a duration of the retract braking process has expired.

21. The apparatus of claim 1, wherein the applied moment is transferable to the lower strut of the shrinkable landing gear via a link of the shrinkable landing gear, the link being rotatably coupled to the wheel and pivotably coupled to the lower strut, the link to pivot rearwardly relative to the lower strut in response to the applied moment.

22. The apparatus of claim 1, wherein the wheel deceleration threshold is predetermined.

23. The apparatus of claim 22, wherein the wheel deceleration threshold is non-variable.

* * * * *